(12) United States Patent
Kasahara et al.

(10) Patent No.: US 10,799,937 B2
(45) Date of Patent: Oct. 13, 2020

(54) COMPONENT MOUNTING SYSTEM AND COMPONENT MOUNTING METHOD

(71) Applicant: KAWASAKI JUKOGYO KABUSHIKI KAISHA, Kobe-shi, Hyogo (JP)

(72) Inventors: Kenji Kasahara, Gifu (JP); Shuhei Segawa, Aisai (JP); Kazunori Hara, Kakogawa (JP); Yuki Takayama, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 185 days.

(21) Appl. No.: 16/097,385

(22) PCT Filed: Apr. 20, 2017

(86) PCT No.: PCT/JP2017/015926
§ 371 (c)(1),
(2) Date: Oct. 29, 2018

(87) PCT Pub. No.: WO2017/188127
PCT Pub. Date: Nov. 2, 2017

(65) Prior Publication Data
US 2019/0143399 A1    May 16, 2019

(30) Foreign Application Priority Data
Apr. 28, 2016  (JP) ................................ 2016-091284

(51) Int. Cl.
*B21J 15/10*    (2006.01)
*B64F 5/10*     (2017.01)
(Continued)

(52) U.S. Cl.
CPC ............... *B21J 15/10* (2013.01); *B21J 15/02* (2013.01); *B21J 15/142* (2013.01); *B21J 15/28* (2013.01);
(Continued)

(58) Field of Classification Search
CPC . B21J 15/10; B21J 15/142; B21J 15/28; B21J 15/30; B21J 15/32; B21J 15/36;
(Continued)

(56) References Cited

U.S. PATENT DOCUMENTS 4,146,924 A * 3/1979 Birk ........................ B25J 9/1692
                                               318/568.13
5,189,514 A * 2/1993 Roden ..................... B21J 15/28
                                                   348/169
(Continued)

OTHER PUBLICATIONS

Kunio Handa et al., "Type of Assembling Jig",Tooling for Aircraft and Missile Manufacture, ASTME, p. 164-172, 1996.
(Continued)

*Primary Examiner* — Jermie E Cozart
(74) *Attorney, Agent, or Firm* — Oliff PLC

(57) ABSTRACT

A component mounting system for mounting a component to a frame member by a fastener, and includes: a machining apparatus configured to machine a hole in each of the frame member and the component along a machining axis and fasten the frame member and the component together by the fastener; a positioning unit configured to perform positioning of a mounting position present on the frame member relative to the machining axis; a robot configured to transfer the component to the mounting position present on the frame member; and a detector including a camera and a sensor, the camera being provided on the machining axis and configured to capture an image of the component transferred to the
(Continued)

mounting position, the sensor being configured to detect a tilt of the component transferred to the mounting position.

10 Claims, 18 Drawing Sheets

(51) Int. Cl.

| | | |
|---|---|---|
| *B64C 1/00* | (2006.01) | |
| *B23P 19/10* | (2006.01) | |
| *B64C 1/06* | (2006.01) | |
| *B21J 15/14* | (2006.01) | |
| *B23P 23/04* | (2006.01) | |
| *B21J 15/28* | (2006.01) | |
| *B21J 15/02* | (2006.01) | |
| *B25J 9/16* | (2006.01) | |
| *B25J 11/00* | (2006.01) | |
| *B21J 15/36* | (2006.01) | |
| *B21J 15/42* | (2006.01) | |
| *B25J 19/02* | (2006.01) | |
| *B25J 13/08* | (2006.01) | |
| *B23P 19/12* | (2006.01) | |
| *B23P 19/04* | (2006.01) | |
| *B21J 15/32* | (2006.01) | |
| *B21J 15/30* | (2006.01) | |

(52) U.S. Cl.
CPC .............. *B21J 15/36* (2013.01); *B21J 15/42* (2013.01); *B23P 19/04* (2013.01); *B23P 19/10* (2013.01); *B23P 19/12* (2013.01); *B23P 23/04* (2013.01); *B25J 9/1697* (2013.01); *B25J 11/005* (2013.01); *B25J 11/007* (2013.01); *B25J 13/08* (2013.01); *B25J 13/086* (2013.01); *B25J 19/022* (2013.01); *B25J 19/023* (2013.01); *B64C 1/00* (2013.01); *B64C 1/06* (2013.01); *B64C 1/061* (2013.01); *B64F 5/10* (2017.01); *B21J 15/30* (2013.01); *B21J 15/32* (2013.01); *B23P 2700/01* (2013.01)

(58) Field of Classification Search
CPC .. B21J 15/42; B21J 15/44; B21J 15/02; B64F 5/10; B23P 19/10; B23P 19/12; B23P 23/04; B23P 2700/01; B25J 9/1697; B25J 11/007; B25J 13/08; B25J 13/086; B25J 13/087; B25J 19/022; B25J 19/023; B64C 1/061

See application file for complete search history.

(56) References Cited

U.S. PATENT DOCUMENTS

| | | | |
|---|---|---|---|
| 5,237,468 A * | 8/1993 | Ellis | B25J 5/02 |
| | | | 360/92.1 |
| 9,610,693 B2 * | 4/2017 | Sarh | B21J 15/142 |
| 2011/0298901 A1 * | 12/2011 | Derrien | G01N 21/9515 |
| | | | 348/50 |
| 2014/0309762 A1 * | 10/2014 | Hayata | B25J 9/1682 |
| | | | 700/114 |
| 2016/0176003 A1 * | 6/2016 | Reckev Cius | B23Q 3/1546 |
| | | | 269/8 |
| 2016/0288331 A1 * | 10/2016 | Sivich | B25J 9/1697 |

OTHER PUBLICATIONS

Kunio Handa, "3. Assembling of Blade Structure of Mid-Size Passenger Aircraft", Aircraft Production Engineering, p. 236, 2002.

\* cited by examiner

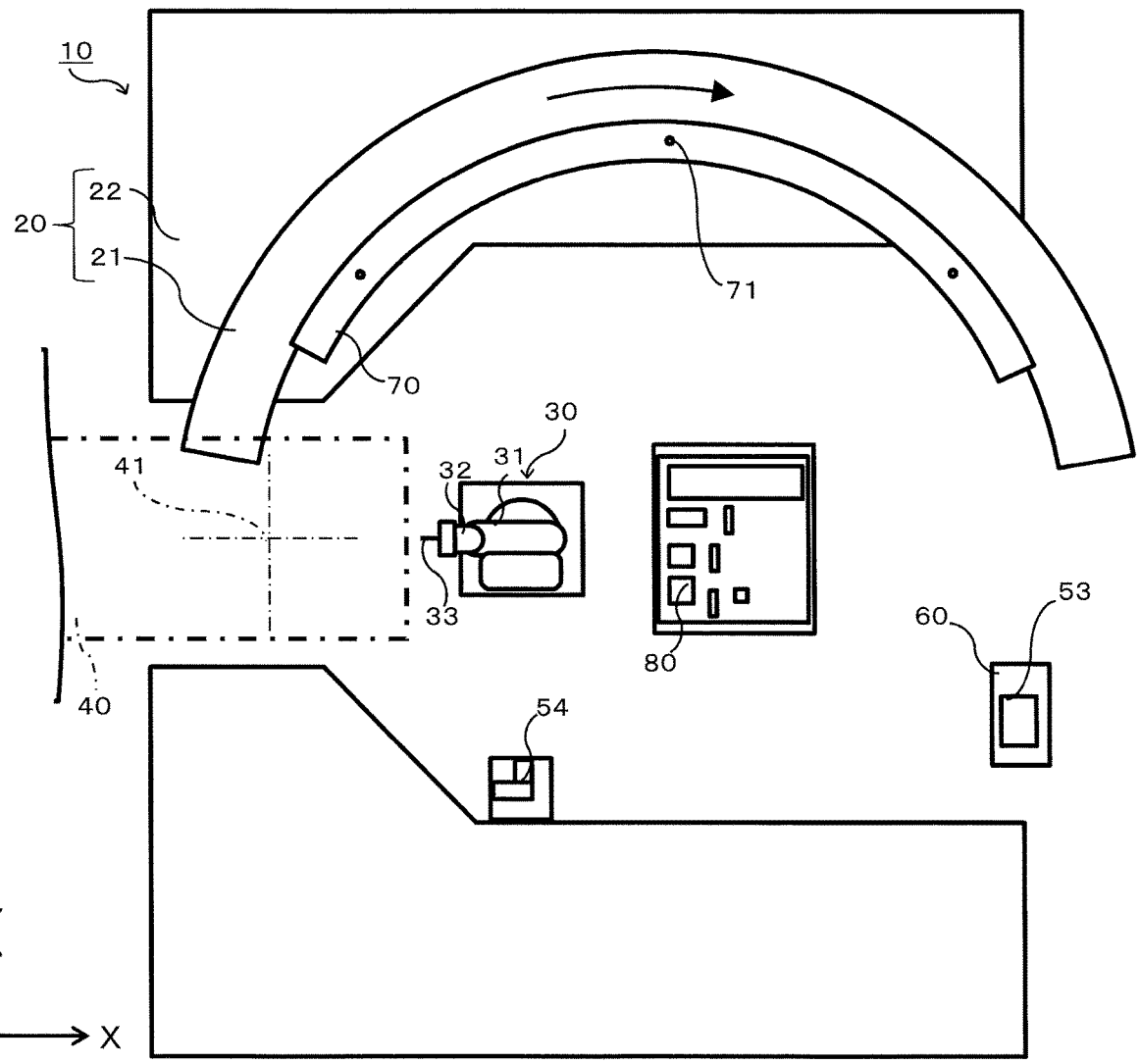
(FIG.5A)
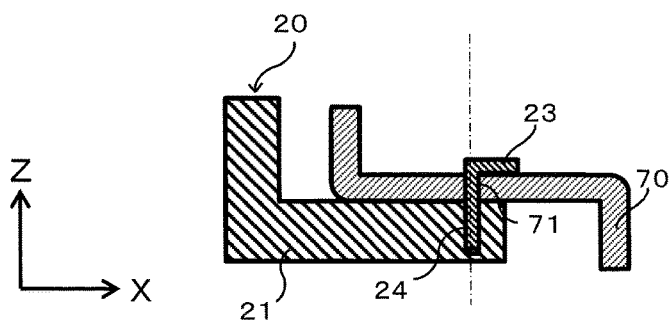
(FIG.5B)

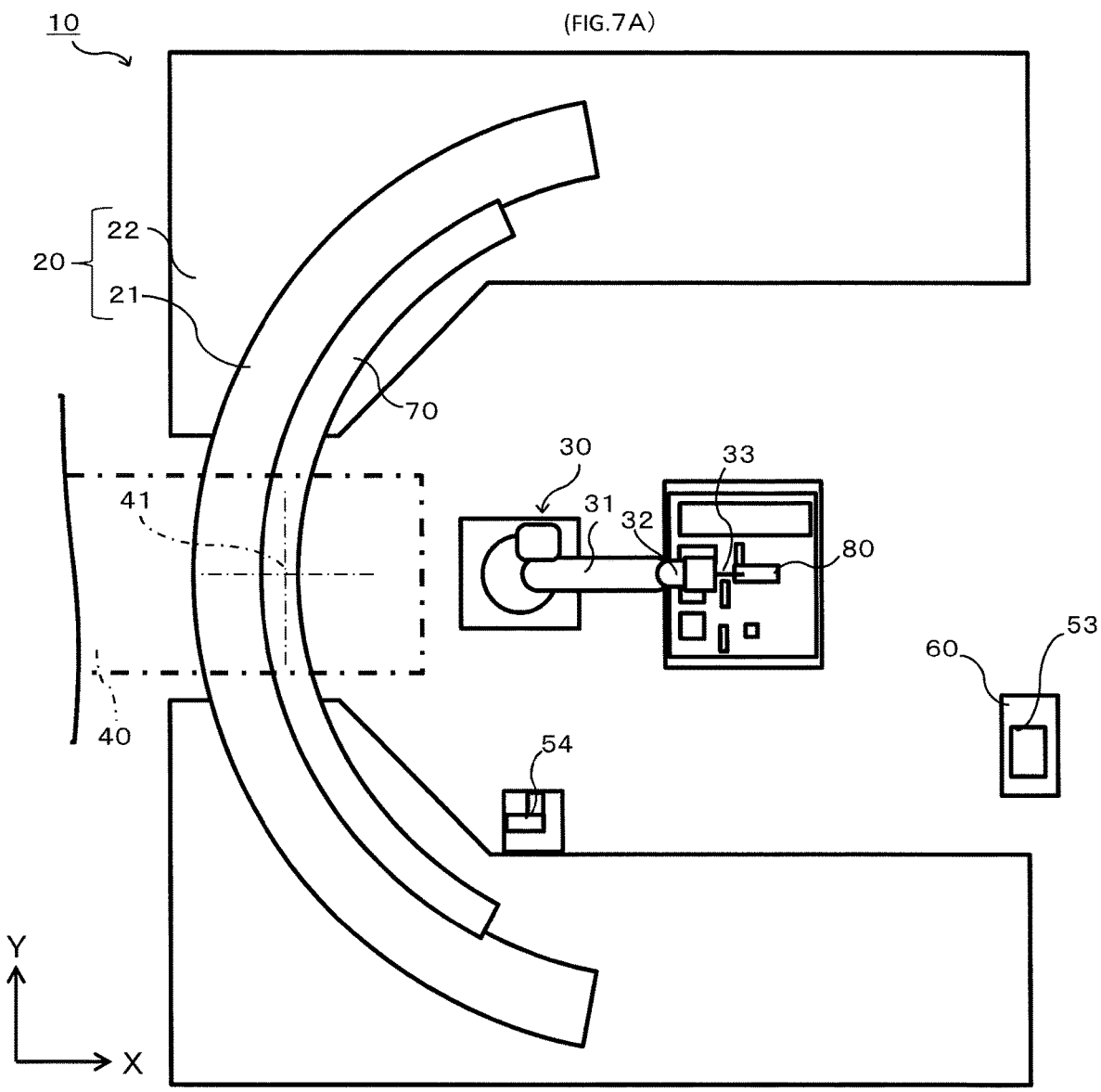
(FIG.7A)
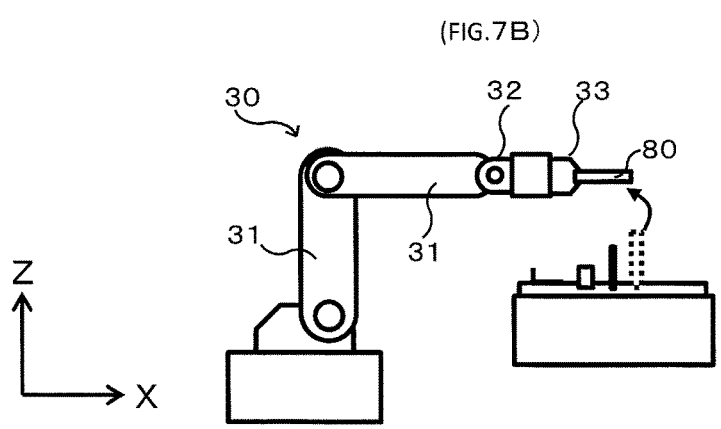
(FIG.7B)

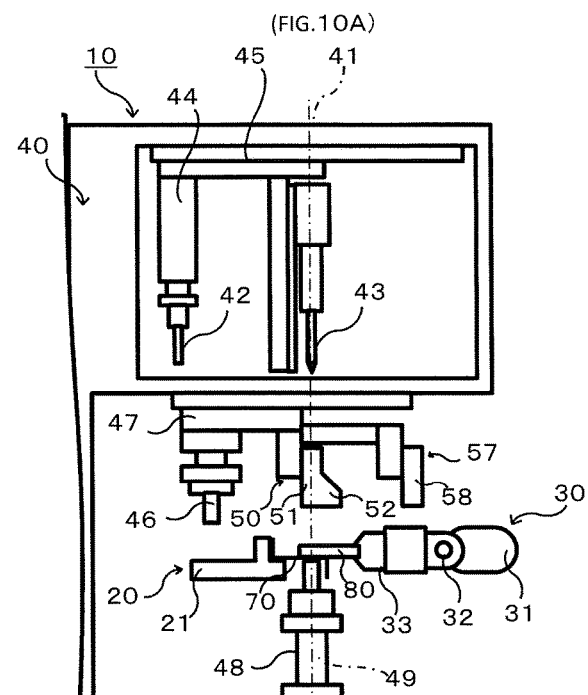
(FIG.10A)
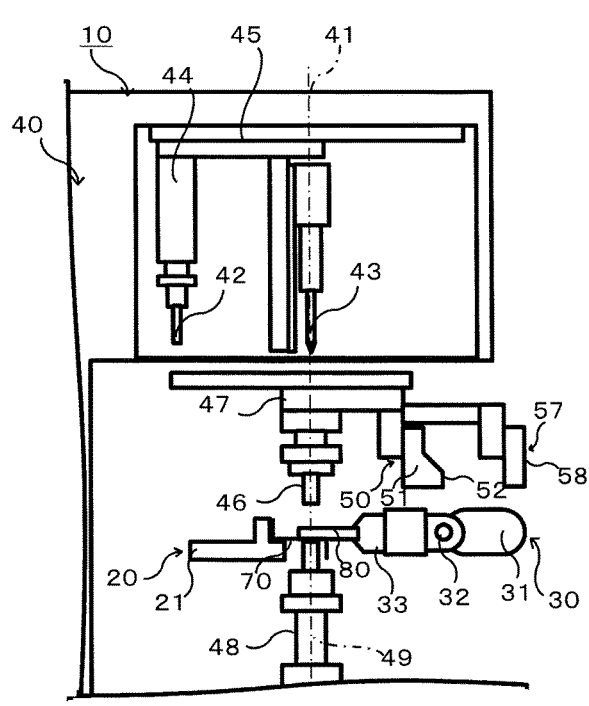
(FIG.10B)
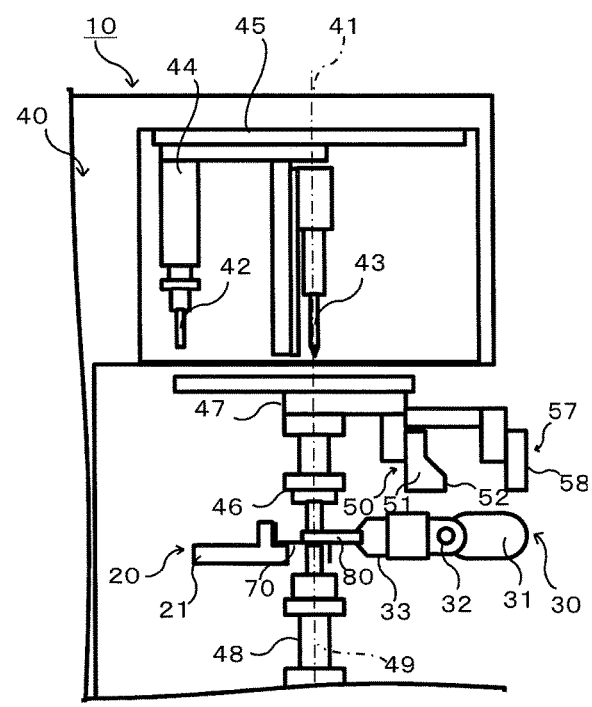
(FIG.10C)

(FIG. 11A)
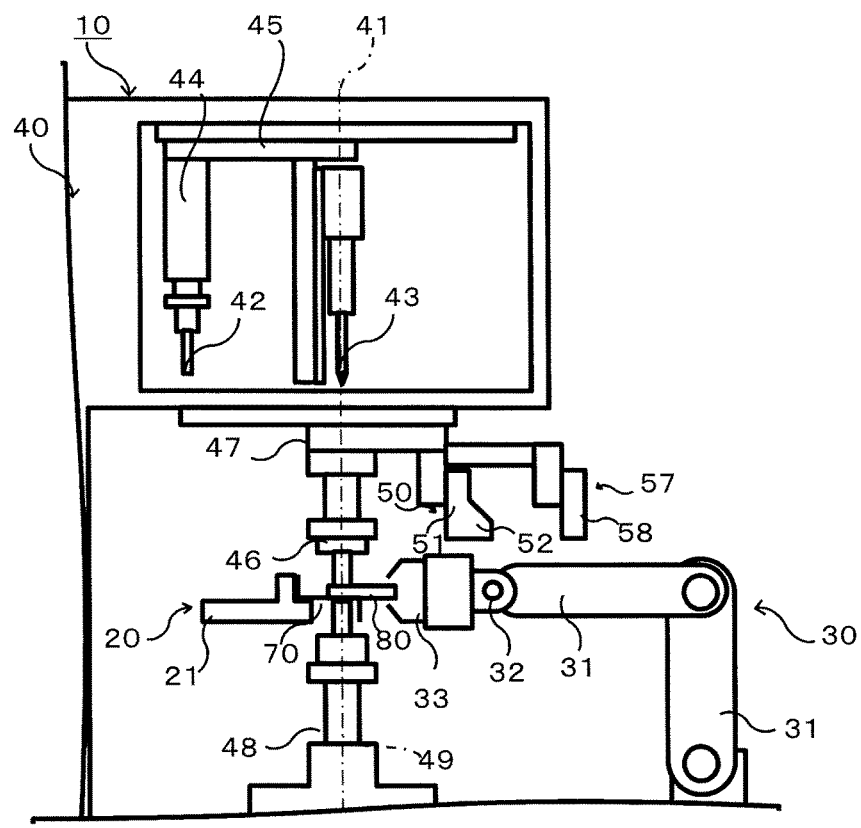
(FIG. 11B)
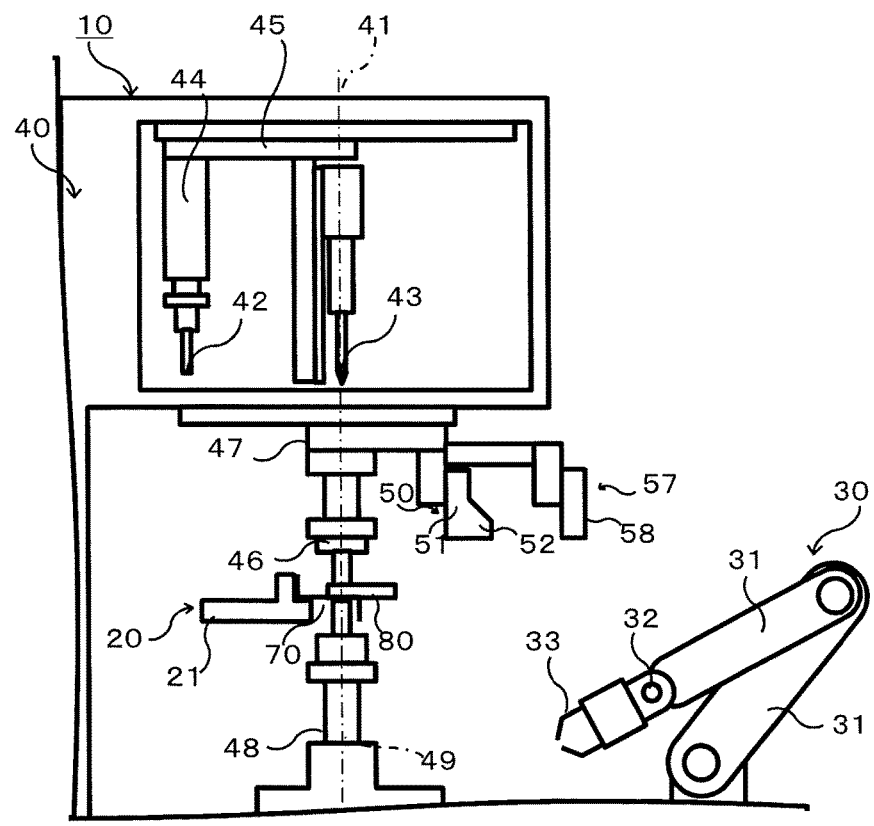

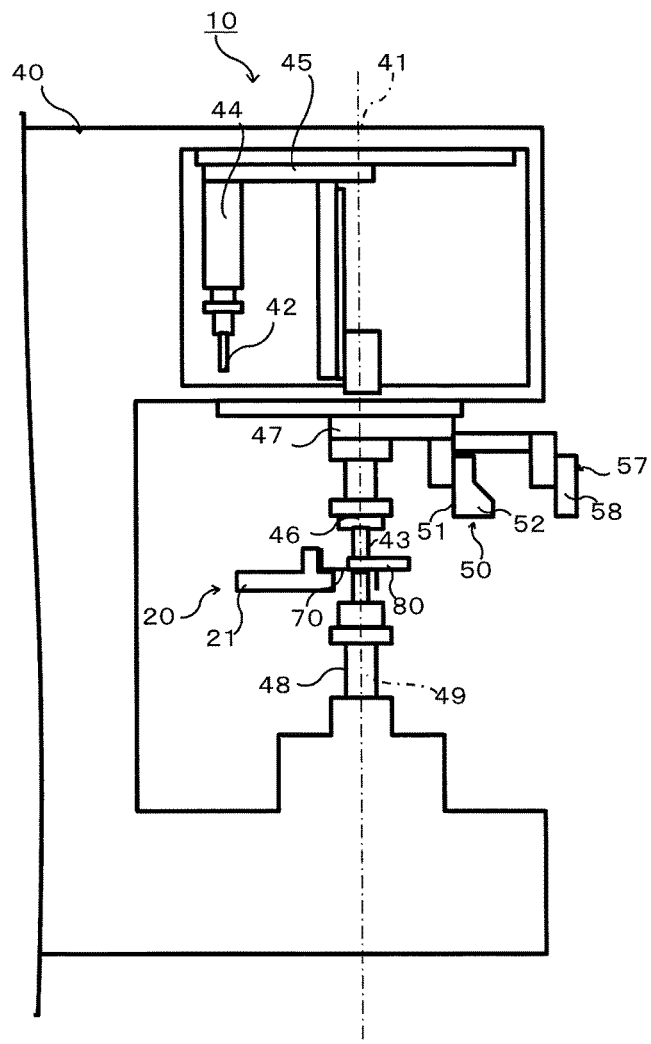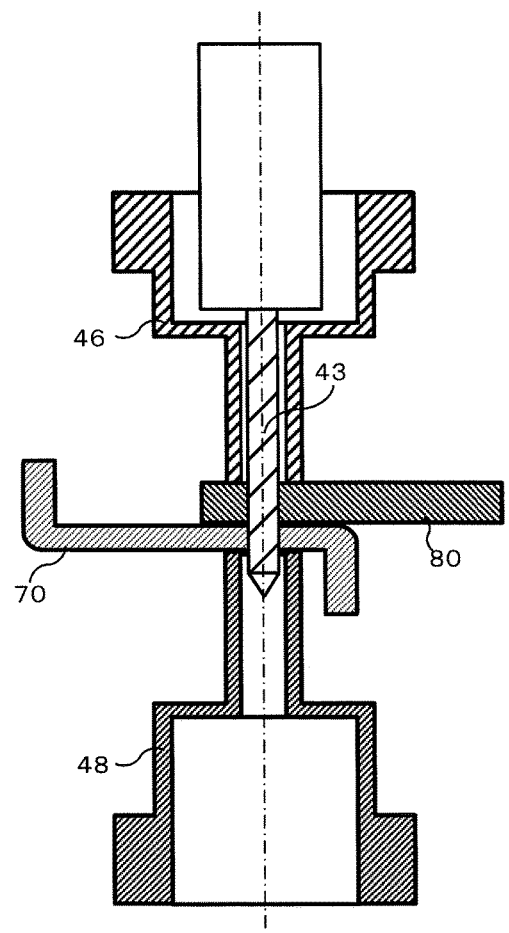

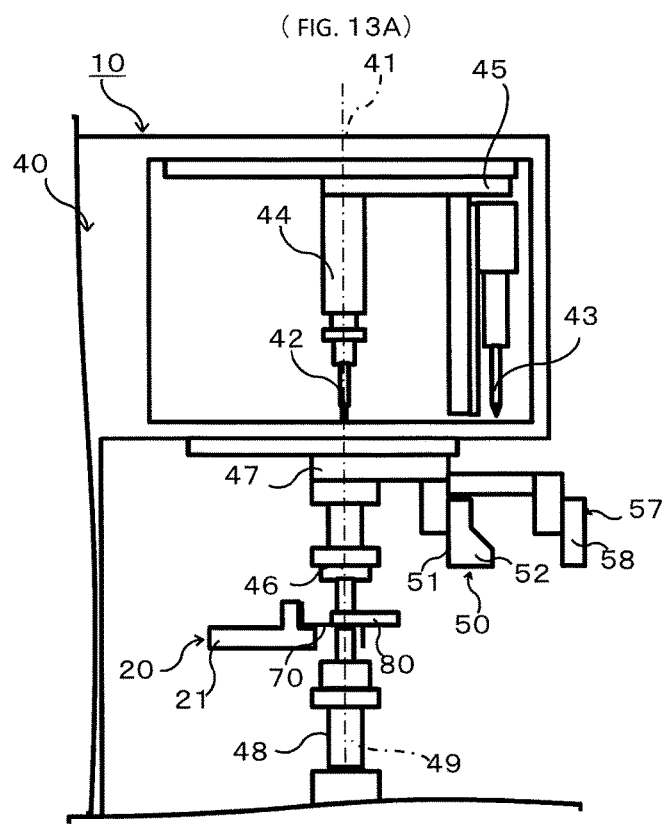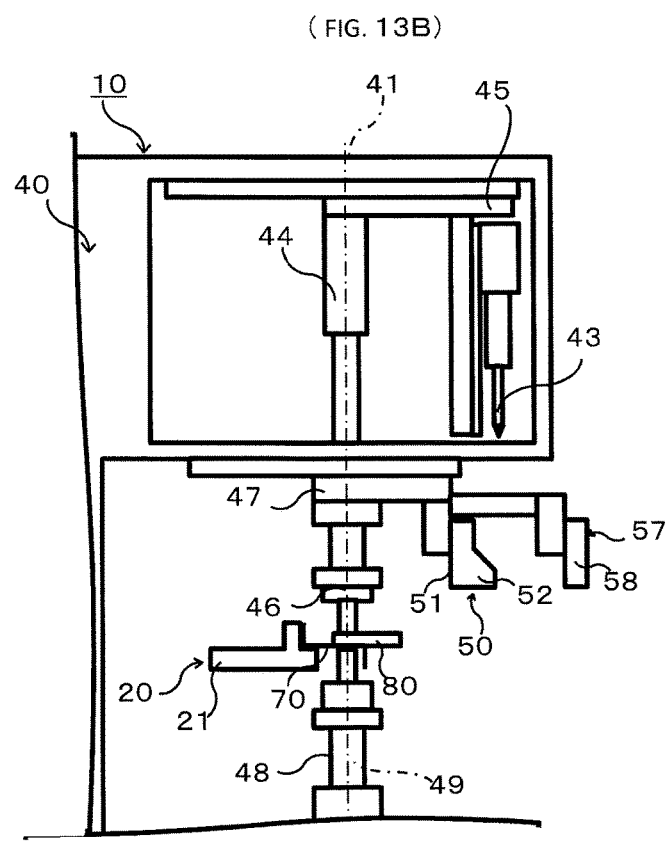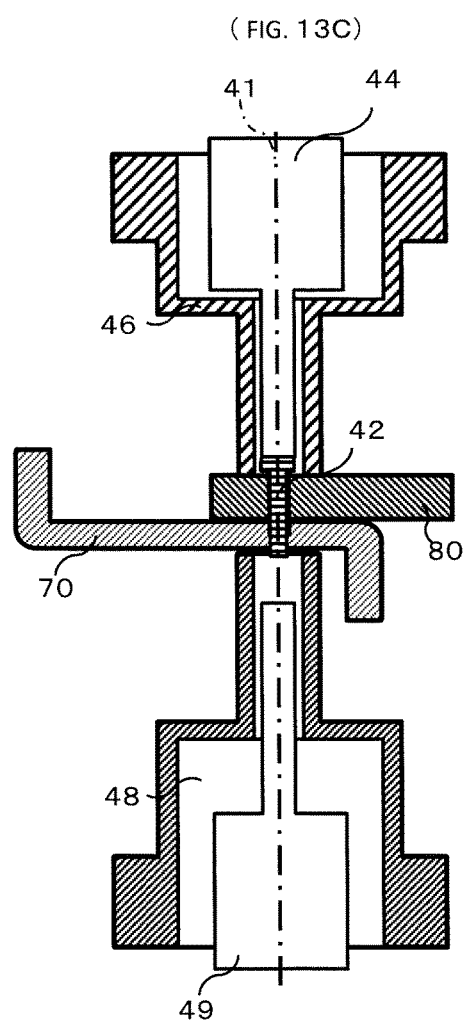

(FIG. 14A)
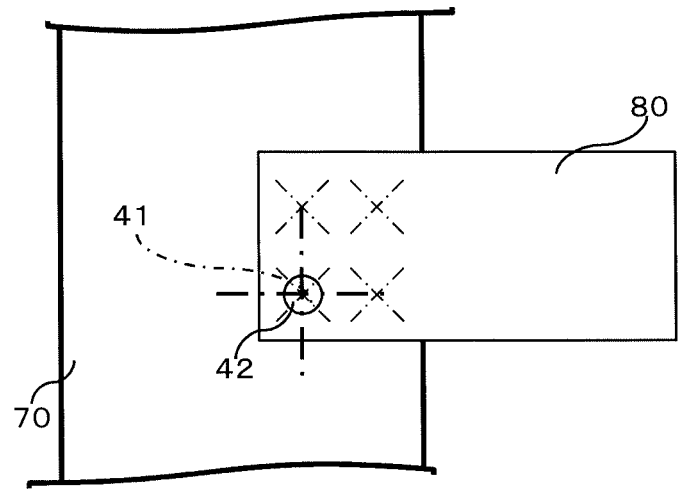
(FIG. 14B)
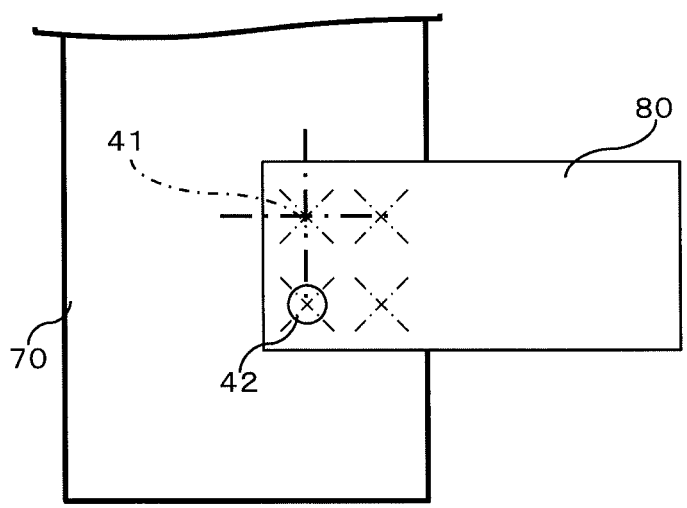

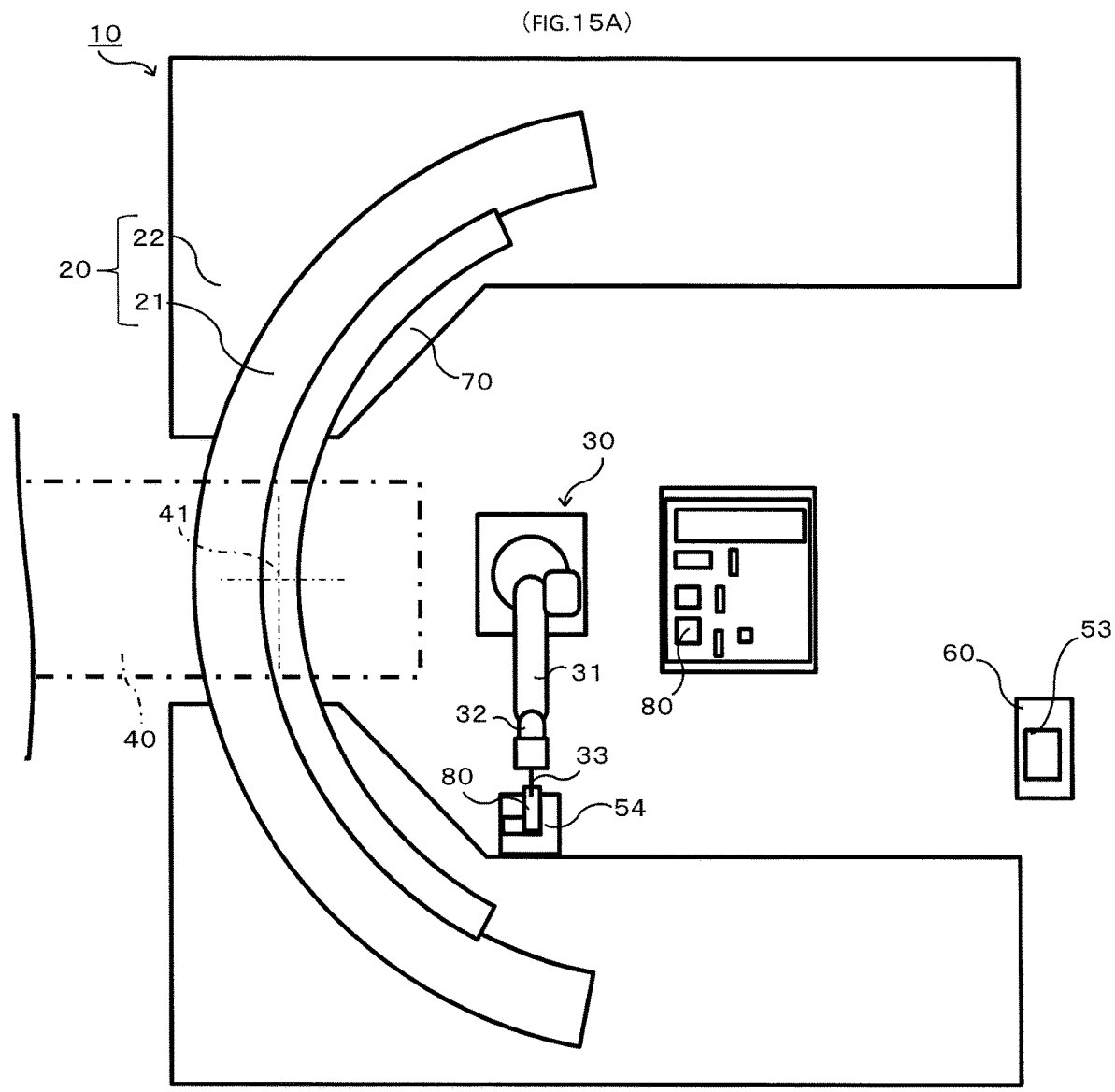
(FIG. 15A)
(FIG. 15B)
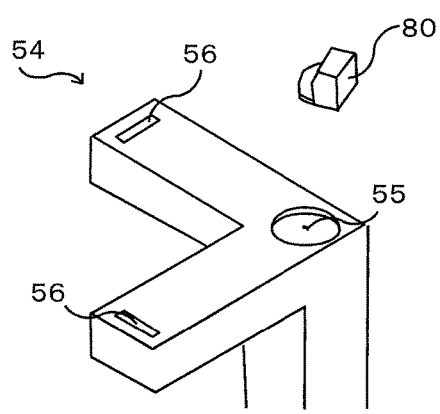
(FIG. 15C)
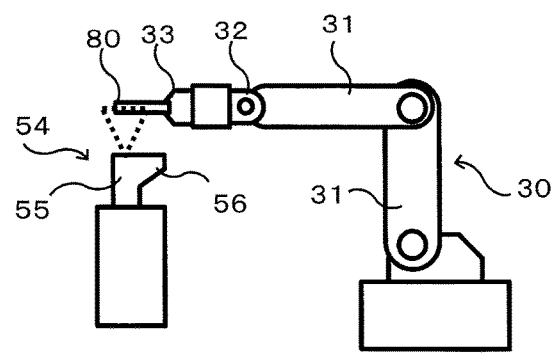

(FIG. 18A)
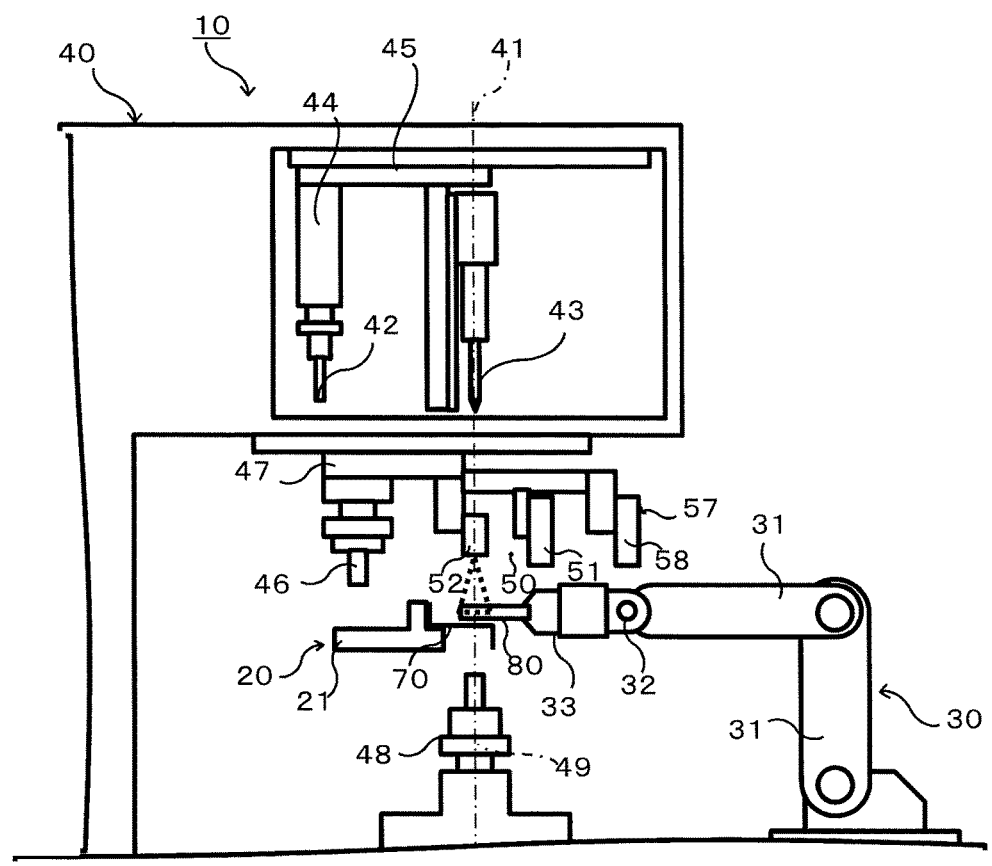
(FIG. 18B)
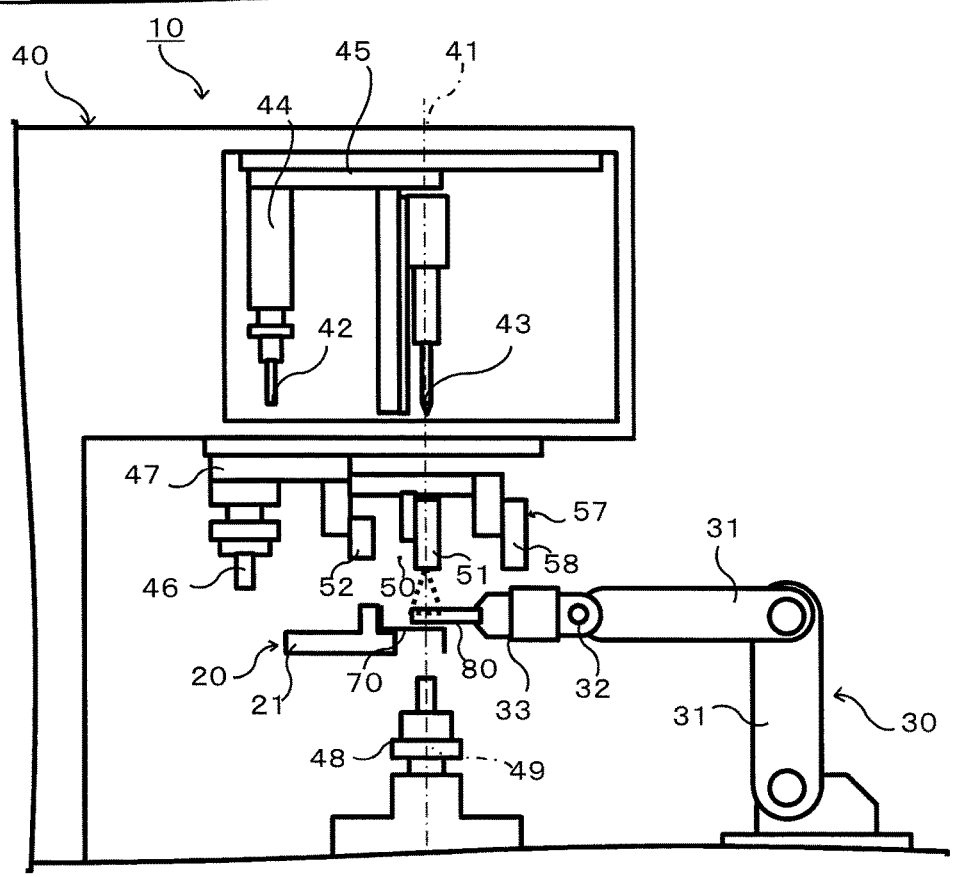

COMPONENT MOUNTING SYSTEM AND COMPONENT MOUNTING METHOD

TECHNICAL FIELD

The present invention relates to a component mounting system for and a component mounting method of mounting a component to a frame member.

BACKGROUND ART

For example, when mounting a component to a frame member of an aircraft or the like (e.g., a frame or a stringer), even if the frame member has a length of 10 to 20 m, the mounting position of the component requires high precision (e.g., required precision: ±0.5 mm). For this reason, when mounting a component to such a frame member, an assembling jig is used as described in, for example, Non-Patent Literature 1 and Non-Patent Literature 2. Components (such as a skin and various stringers) are positioned on, for example, jig locators (positioning blocks and plates) and contour bars (skin surface positioning templates of a fuselage structure) of the assembling jig, and then the components are fastened by rivets. In this manner, high mounting precision of the components is realized.

CITATION LIST

Non-Patent Literature

NPL 1: "Koukuuki & Roketto No Seisan Gijutsu (Tooling for Aircraft and Missile Manufacture)" authored and edited by ASTME, translated by Kunio Handa and Kenji Sasaki, published in 1996 by TAIGA Publishing Co., Ltd., pp. 164 to 172, "Kumitate Jigu No Taipu (Type of Assembling Jig)".

NPL 2: "Koukuuki Seisan Kougaku (Aircraft Production Engineering)", authored by Kunio Handa, published in 2002 by Office HANS, p. 236, "3. Chuugata Ryokakuki No Tsubasa Kouzou Kumitate (3. Assembling of Blade Structure of Mid-Size Passenger Aircraft)".

SUMMARY OF INVENTION

Technical Problem

In Non-Patent Literature 1 and Non-Patent Literature 2, the positioning of aircraft components is performed by using an assembling jig in order to satisfy the high mounting precision of the aircraft components. In this respect, it is conceivable to perform the positioning of the components on frame members by using a robot. However, it is difficult, by merely using a robot, to perform the positioning with the aforementioned high precision.

The present invention has been made to solve the above-described problems, and an object of the present invention is to provide a component mounting system and a component mounting method that realize improvement in the precision of a mounting position when mounting a component to a frame member by using a robot.

Solution to Problem

A component mounting system according to one aspect of the present invention is a component mounting system for mounting a component to a frame member by a fastener. The component mounting system includes: a machining apparatus configured to machine a hole in each of the frame member and the component along a machining axis and fasten the frame member and the component together by the fastener; a positioning unit configured to perform positioning of a mounting position present on the frame member relative to the machining axis; a robot configured to transfer the component to the mounting position present on the frame member; and a detector including a camera and a sensor, the camera being provided on the machining axis and configured to capture an image of the component transferred to the mounting position, the sensor being configured to detect a tilt of the component transferred to the mounting position. The robot performs positioning of a machining position present on the component and a machining direction of the component relative to the machining axis based on a position and the tilt of the component, the position being determined based on the image captured by the camera, the tilt being detected by the sensor.

According to the above configuration, the position of the component is detected by the camera provided on the machining axis, and the tilt of the component is detected by the sensor. Based on the detection results, the machining position and the machining direction of the component are adjusted relative to the machining axis. Accordingly, the component need not be moved from its detected position to be on the machining axis. This makes it possible to perform highly precise positioning of the component relative to the frame member when mounting the component to the frame member.

In the component mounting system, the positioning unit may be a conveying apparatus configured to move the frame member in a direction orthogonal to the machining axis. According to this configuration, the frame member is moved relative to the machining axis by the conveying apparatus. This makes it possible to increase the precision of the positioning of the component relative to the frame member.

In the component mounting system, the sensor may include a laser emitter configured to emit laser light to the component. The camera may capture the image of the component, on which the laser light is projected. The detector may include an image processor configured to determine the position and the tilt of the component by processing the image captured by the camera. According to this configuration, the camera doubles as a detector detecting the laser light that is emitted from the laser emitter and projected on the component. This makes it possible to reduce costs and size-increasing factors.

Further, in the component mounting system, the sensor may be a first sensor, and the detector may be a first detector. The component mounting system may further include a second detector including a second sensor configured to detect a tilt of the component from a direction that is different than a direction of detection by the first sensor. Further, in the component mounting system, the second sensor may include: a laser emitter configured to emit laser light to the component; and an image obtainer configured to capture an image of the component, on which the laser light is projected. The second detector may include an image processor configured to process the image captured by the image obtainer to determine the tilt and a height of the component. Assume, for example, that the tilt of the component cannot be detected from one side due to some restriction, for instance, due to the shape of the component. According to the above configuration, even in such a case, the tilt of the component can be detected from the other side. This makes it possible to increase the precision of the positioning of the component relative to the frame member.

In the component mounting system, the camera may be a first camera, and the detector may be a first detector. The component mounting system may further include a third detector including a second camera provided at a position not on the machining axis, the second camera being configured to capture an image of the component transferred to the mounting position and detect a position of the component. Further, in the component mounting system, the third detector may include an image processor configured to process the image captured by the second camera to determine the position and a rotation of the component. According to this configuration, for example, even if the component is large, since the detection of the position of the component can be performed at two positions, the precision of the positioning of the component relative to the frame member can be still increased.

In the component mounting system, the fastener may be a rivet. The machining apparatus may be a riveter configured to machine the hole in each of the frame member and the component along the machining axis and fasten the frame member and the component together by the rivet.

In the component mounting system, the frame member and the component may be used in an aircraft. According to this configuration, even in a case where very high positioning precision is required, such as in a case where the frame member and the component are used in an aircraft, the required precision can be satisfied.

A component mounting method according to another aspect of the present invention includes: performing positioning of a mounting position present on a frame member relative to a machining axis; transferring a component to the mounting position present on the frame member; determining a position of the component based on an image of the component transferred to the mounting position, the image being captured on the machining axis; detecting a tilt of the component transferred to the mounting position; performing positioning of a machining position present on the component and a machining direction of the component relative to the machining axis based on the position and the tilt of the component; and machining a hole in each of the frame member and the component along the machining axis, and fastening the frame member and the component together by a fastener.

Advantageous Effects of Invention

The present invention is configured as described above, and has an advantage of being able to provide a component mounting system and a component mounting method that realize improvement in the precision of a mounting position when mounting a component to a frame member by using a robot.

The above and other objects, features, and advantages of the present invention will more fully be apparent from the following detailed description of preferred embodiments with accompanying drawings.

BRIEF DESCRIPTION OF DRAWINGS

FIG. 5A shows a state where a frame member is fixed to a positioning unit, and FIG. 5B shows a state where a positioning pin is inserted in a first reference hole of the frame member and a second reference hole of a first positioner.

FIG. 7A shows a state where a hand is disposed over a pallet, and FIG. 7B shows a state where the hand is holding a component.

FIG. 10A shows a state where the component is brought closer to the frame member;

FIG. 10B shows a state where the central axis of a pressure foot is brought into coincidence with the machining axis; and FIG. 10C shows a state where the component and the frame member are sandwiched between the pressure foot and a lower clamp, and thus fixed.

FIG. 11A shows a state where the holding of the component by the hand is released, and FIG. 11B shows a state where a robot is removed from the riveter.

FIG. 12A is a side view showing a state where a drill is lowered along the machining axis while being rotated, and FIG. 12B is a sectional view showing a state where a hole is machined in each of the component and the frame member by the drill.

FIG. 13A is a side view showing a state where the central axis of the shaft of a rivet coincides with the machining axis; FIG. 13B is a side view showing a state where an upper anvil is lowered; and FIG. 13C is a side view showing a state where the rivet is inserted in the machined holes.

FIG. 14A is a top view of the mounting position present on the frame member and the machining axis of the riveter, and FIG. 14B is a top view of another mounting position present on the frame member and the machining axis of the riveter.

FIG. 15A is a top view of the component mounting system according to Embodiment 2 of the present invention; FIG. 15B is a perspective view of a second detector and a component of FIG. 15A; and FIG. 15C is a side view of the second detector, the component, and the robot.

FIG. 18A is a side view of the component mounting system according to another embodiment of the present invention, and FIG. 18B is a side view showing a state where a first camera of FIG. 18A is disposed on the machining axis of the riveter.

DESCRIPTION OF EMBODIMENTS

Figure 1:
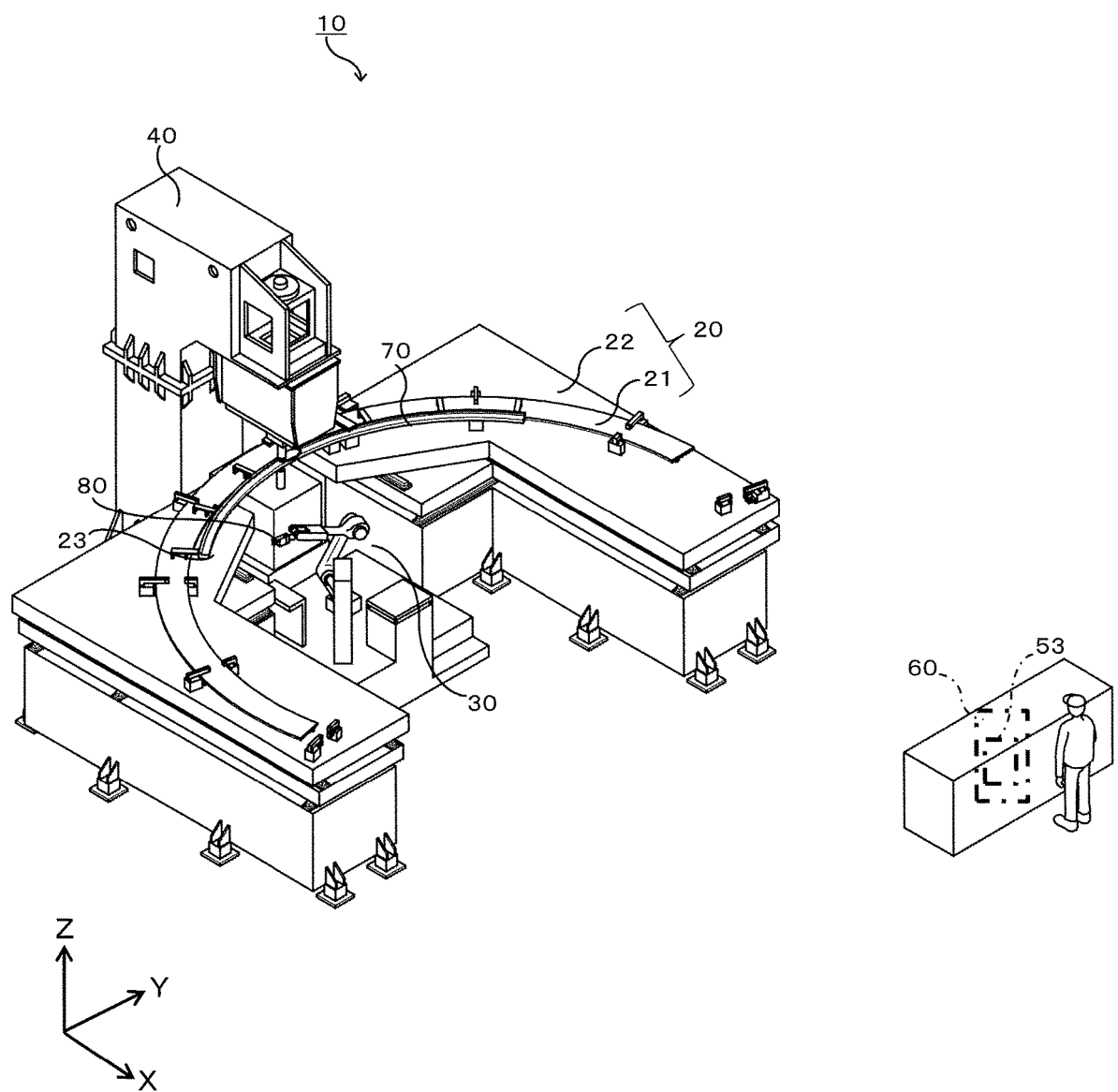
FIG. 1 is a perspective view of a component mounting system according to Embodiment 1 of the present invention.

Hereinafter, embodiments of the present invention are specifically described with reference to the drawings. In the drawings, the same or corresponding elements are denoted by the same reference signs, and repeating the same descriptions is avoided below. For the sake of convenience of the description, a direction parallel to the machining axis of a riveter is referred to as "Z-direction"; a direction that connects the machining axis of the riveter and the base axis of a robot and that is orthogonal to the Z-direction is referred to as "X-direction"; and a direction orthogonal to the Z-direction and the X-direction is referred to as "Y-direction".

Embodiment 1

Figure 2:
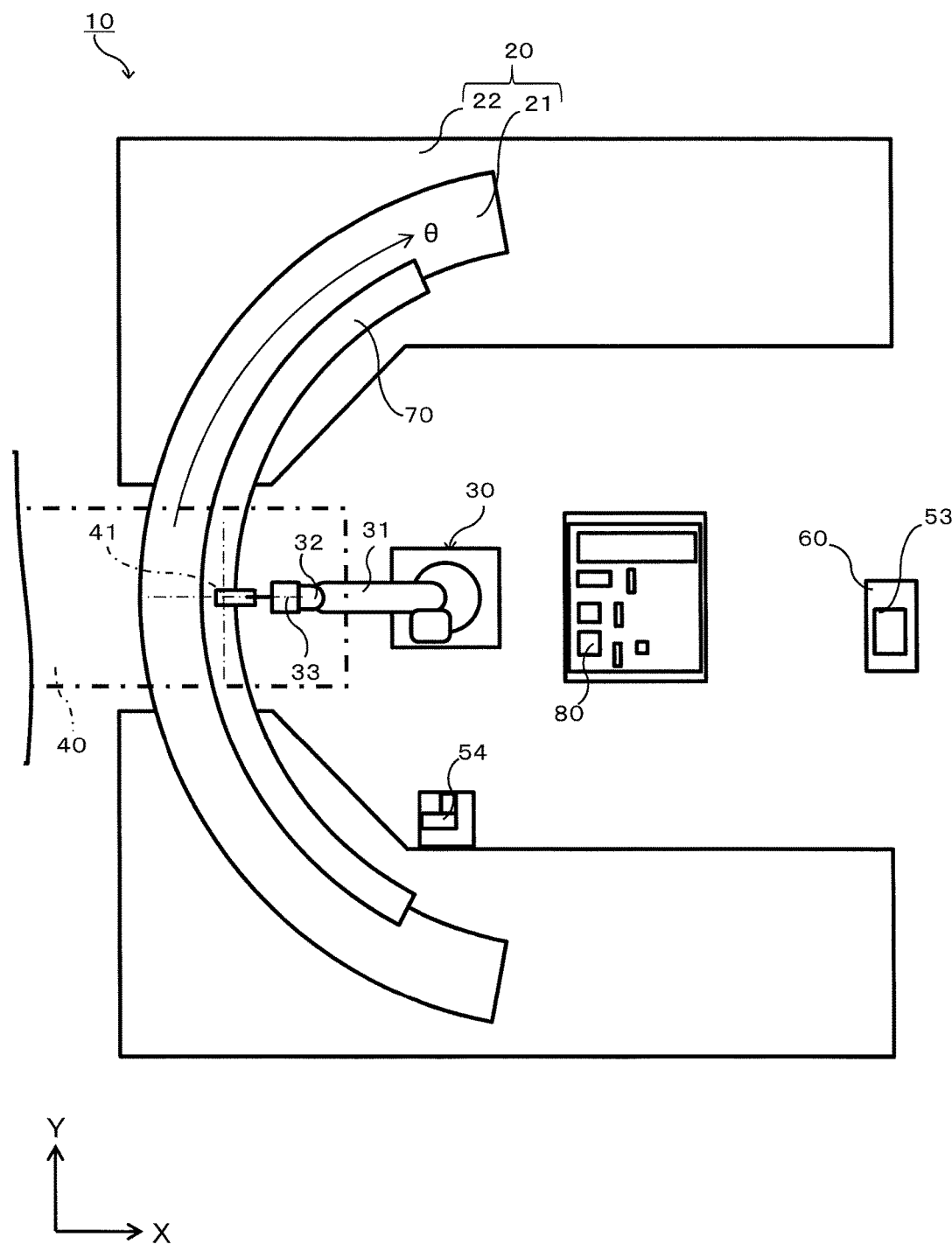
FIG. 2 is a top view of the component mounting system of FIG. 1.
Figure 3:
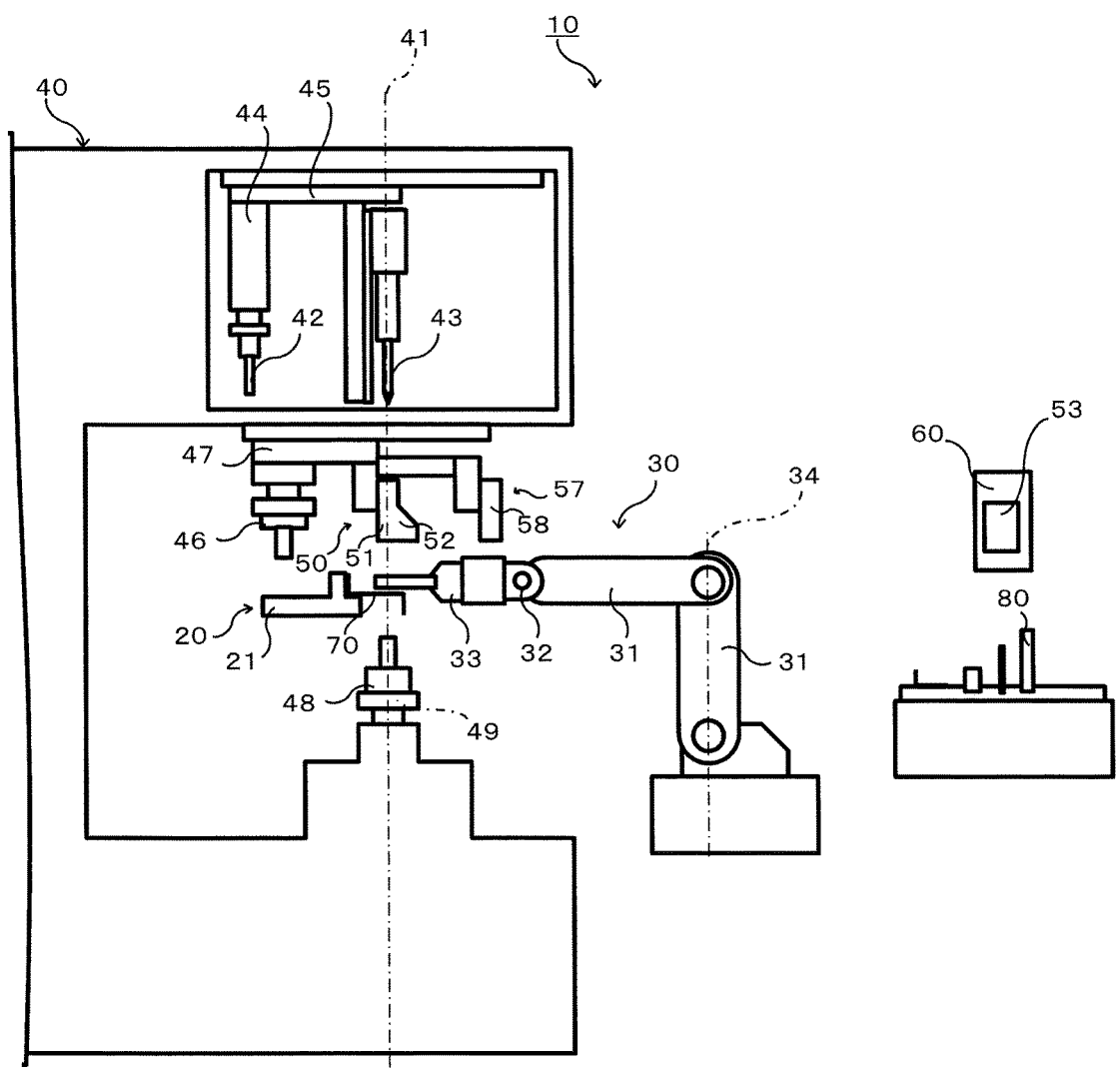
FIG. 3 is a side view of the component mounting system of FIG. 1.

Hereinafter, the configuration of a component mounting system 10 according to Embodiment 1 is described with reference to FIG. 1 to FIG. 3. It should be noted that the description below describes a case where the component mounting system 10 according to the present invention is applied to a system for mounting a component 80 to an aircraft frame (a frame member) 70. However, the frame member 70 is not limited to an aircraft frame. Alternatively, an aircraft frame member different from an aircraft frame, such as a stringer, or a non-aircraft frame member can be adopted as the frame member 70. The component 80 is not limited to an aircraft component, but may be a non-aircraft component.

The component mounting system 10 includes a positioning unit 20, a robot 30, a riveter 40, a first detector 50, and a controller 60. The positioning unit 20 is an apparatus configured to perform positioning of a mounting position present on the frame member 70 relative to a machining axis 41. For example, a conveying apparatus configured to convey the frame member 70 is used as the positioning unit 20. The positioning unit 20 includes a first positioner 21 and a second positioner 22 both configured to move the frame member 70.

The first positioner 21 has a shape corresponding to the shape of the frame member 70 in a direction orthogonal to the machining axis 41 of the riveter 40. For example, the first positioner 21 is arc-shaped corresponding to the arc-shaped frame member 70. The upper surface of the first positioner 21 is a surface on which the frame member 70 is to be placed. The first positioner 21 is disposed such that the upper surface thereof is orthogonal to the machining axis 41 of the riveter 40, and such that the upper surface is, for example, in a horizontal orientation. The first positioner 21 is movable relative to the center of the arc in a circumferential direction (direction θ).

The second positioner 22 is disposed below the first positioner 21, and is capable of supporting the first positioner 21 and moving the first positioner 21 in the X-direction and the Y-direction. Thus, the frame member 70 is moved by the first positioner 21 and the second positioner 22 in the direction orthogonal to the machining axis 41 (e.g., horizontal direction).

The robot 30 is an apparatus configured to transfer the component 80 to the mounting position present on the frame member 70, and based on an image captured by a first camera 51 and the position and tilt of the component 80 detected by a first sensor, perform positioning of a machining position present on the component 80 and a machining direction of the component 80 relative to the machining axis 41. The robot 30 is disposed such that the position thereof is shifted from the arc-shaped first positioner 21 toward the center of the arc. As one example, a horizontal articulated robot or vertical articulated robot is used as the robot 30. The robot 30 includes an arm 31, a wrist 32, and a hand 33.

The arm 31 is coupled by a rotary joint to a base axis 34, which extends in the Z-direction. The arm 31 is capable of turning about the base axis 34 and moving the wrist 32 in each of the X, Y, and Z directions. The base axis 34 is provided such that it extends, for example, parallel to the machining axis 41 of the riveter 40. The wrist 32 is coupled by a rotary joint to the distal end of the arm 31, and is capable of moving the hand 33 in the Z-direction relative to the arm 31. The hand 33 is coupled to the wrist 32, and is capable of holding the component 80 or the like, for example, by suction or in a sandwiching manner. Each of the joints is provided with, for example, a driving servomotor (not shown) and an encoder (not shown) configured to detect the rotation angle of the servomotor.

The riveter 40 is an apparatus configured to machine a hole in each of the frame member 70 and the component 80 along the machining axis 41 and fasten the frame member 70 and the component 80 together by a rivet 42, thereby mounting the component 80 to the frame member 70. The machining axis 41 serves as a reference line. When performing the fastening, the center line of the shaft of the rivet 42 is brought into coincidence with the reference line, which is the machining axis 41.

The riveter 40 is in the shape of, for example, a C frame member. When seen in a side view, the riveter 40 has a C-shaped body, and an inner space is formed in the body. The inner space is open toward the robot 30.

A drill 43 and an upper anvil 44 are arranged in a space above the inner space. The drill 43 and the upper anvil 44 are mounted to a first displacer 45, and are arranged in the X-direction such that the drill 43 and the upper anvil 44 are space apart from each other. The first displacer 45 extends in the X-direction. The first displacer 45 is capable of moving the position of each of the drill 43 and the upper anvil 44 in the X-direction, and is configured to dispose each of the drill 43 and the upper anvil 44 on the machining axis 41 of the riveter 40. Since the space above the inner space is open toward the inner space, the drill 43 and the upper anvil 44 can be moved to the inner space by lowering the drill 43 and the upper anvil 44.

The drill 43 is, for example, a tool configured to machine a hole in each of the frame member 70 and the component 80 by rotating, and has a columnar shape. The drill 43 is disposed such that the rotational axis thereof is parallel to the machining axis 41. The upper anvil 44 is a tool for holding the rivet 42, inserting the rivet 42 into the hole of the frame member 70 and the hole of the component 80, and swaging the rivet 42 by pressing the rivet 42 from above. The upper anvil 44 is disposed such that the center line of the shaft of the rivet 42 held by the upper anvil 44 and the direction in which the upper anvil 44 presses the rivet 42 are parallel to the machining axis 41.

The first detector 50 and a pressure foot 46 are arranged in the upper part of the inner space. The first detector 50 and the pressure foot 46 are mounted to a second displacer 47, and are arranged in the X-direction such that the first detector 50 and the pressure foot 46 are spaced apart from each other. The second displacer 47 extends in the X-direction. The second displacer 47 is capable of moving the position of each of the first detector 50 and the pressure foot 46 in the X-direction, and is configured to dispose each of the first detector 50 and the pressure foot 46 on the machining axis 41 of the riveter 40.

The first detector 50 detects the position and tilt of the component 80. The first detector 50 is constituted by a camera (first camera) 51, a laser emitter (first laser emitter) 52, and an image processor 53. In the present embodiment, the first laser emitter 52 and the first camera 51 are integrated together. Although the controller 60 includes the image processor 53 in the present embodiment, the image processor 53 may be provided separately from the controller 60.

The first camera 51 is provided on the machining axis 41, and is disposed such that the optical axis of the first camera 51 coincides with the machining axis 41 of the riveter 40. The first camera 51 captures an image of the component 80 transferred to the mounting position present on the frame member 70. The first camera 51 outputs the obtained image of the component 80 to the image processor 53. By comparing the obtained contour of the component 80 with design information such as CAD information stored in the controller 60, the position (X and Y coordinates) and rotation (tilt RZ about the Z-axis) of the component 80 are determined.

The first laser emitter 52 is a device configured to emit laser light to the component 80 transferred to the mounting position. The first laser emitter 52 may be disposed on the machining axis 41 of the riveter 40, or may be disposed near the machining axis 41. The first camera 51 obtains an image of the component 80, on which the laser light emitted from the first laser emitter 52 is projected, and outputs the image to the image processor 53. Based on, for example, the position or shape of the laser light projected on the component 80, the height (Z coordinate) and tilt (tilt RX about the X-axis and tilt RY about the Y-axis) of the component 80 are determined. Accordingly, the first camera 51 also functions as a light receiver of the first laser emitter 52, and the first camera 51 and the first laser emitter 52 collectively function as a sensor (first sensor) that detects the tilt of the component 80 transferred to the mounting position.

The pressure foot 46 is a tool configured to press the component 80 from above when performing the hole machining and when performing the insertion and swaging of the rivet 42. The pressure foot 46 has a cylindrical shape and has a hollow center, such that the drill 43 or the upper anvil 44 is insertable in the interior space of the pressure foot 46. The central axis of the cylindrical shape coincides with or is parallel to the machining axis 41 of the riveter 40, and the lower end of the cylindrical shape is located on a plane orthogonal to the machining axis 41.

A lower clamp 48 and a lower anvil 49 are arranged in the lower part of the aforementioned inner space. The lower clamp 48 is a tool configured to press the component 80 from below when performing the hole machining and when performing the insertion and swaging of the rivet 42. The lower clamp 48 has a cylindrical shape, such that the drill 43 or the lower anvil 49 is insertable in the interior space of the lower clamp 48. The central axis of the cylindrical shape, which has a hollow center, coincides with or is parallel to the machining axis 41 of the riveter 40, and the upper end of the cylindrical shape is located on a plane orthogonal to the machining axis 41.

The lower anvil 49 is a tool configured to press the rivet 42 from below to crush the lower part of the rivet 42 when performing the swaging of the rivet 42. The lower anvil 49 has a columnar shaft, and is disposed such that the center line of the shaft and the direction in which the lower anvil 49 presses the rivet 42 coincide with the machining axis 41.

In the aforementioned inner space, the first positioner 21 of the positioning unit 20 is disposed such that the frame member 70 is located below the first detector 50 and the pressure foot 46 and above the lower clamp 48 and the lower anvil 49. The first positioner 21 is disposed such that the frame member 70 is interposed between the first positioner 21 and the robot 30 in the X-direction.

The controller 60 includes an arithmetic operation unit (not shown) and a storage unit (not shown). The controller 60 is, for example, a robot controller including a computer such as a microcontroller. It should be noted that the controller 60 may be configured as a single controller 60 performing centralized control, or may be configured as a plurality of controllers 60 performing distributed control in cooperation with each other.

A ROM, RAM, or the like is used as the storage unit. The storage unit stores a basic program for the robot controller and information such as various fixed data. A CPU or the like is used as the arithmetic operation unit. The arithmetic operation unit controls the constituent elements of the component mounting system 10 by loading and executing software, such as the basic program stored in the storage unit.

Figure 4:
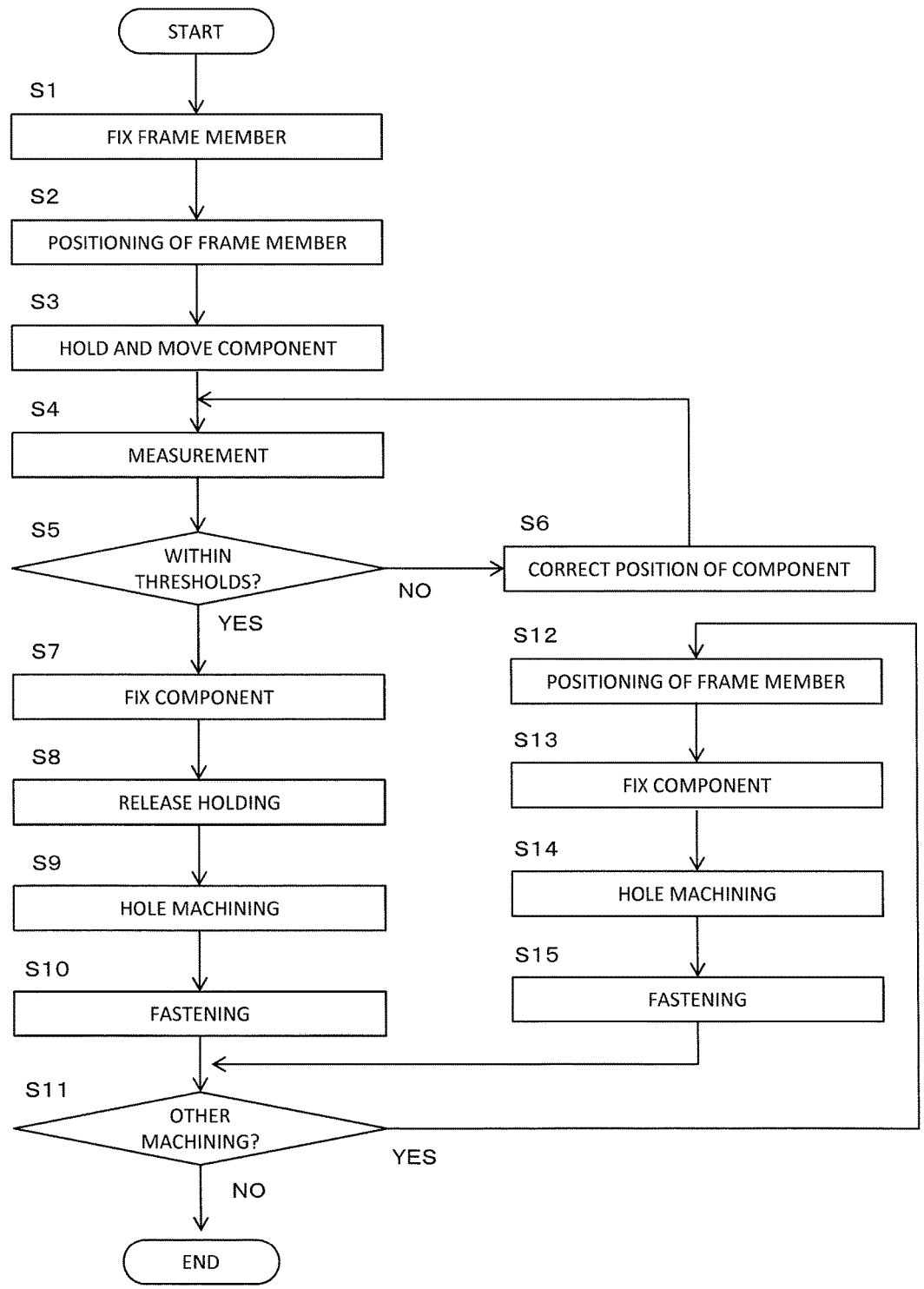
FIG. 4 is a flowchart showing one example of a component mounting method.

Next, operations of the component mounting system 10 (i.e., component mounting method) are described with reference to FIG. 4 to FIG. 14. The operations of the component mounting system 10 indicated in steps S1 to S15 of FIG. 4 are controlled by the controller 60.

First, the frame member 70 is fixed to the positioning unit 20 (step S1). For example, as shown in FIG. 5A, the first positioner 21 is moved and disposed at a predetermined setting position. The frame member 70 is provided with first reference holes 71 preformed therein at three respective positions. As shown in FIG. 5B, the first reference holes 71 are brought into coincidence with second reference holes 24 of the first positioner 21, and positioning pins 23 are inserted in the first reference holes 71 and the second reference holes 24, thereby positioning and fixing the frame member 70 on the first positioner 21.

It should be noted that the first reference holes 71 are arranged at predetermined respective positions relative to the contour of the frame member 70, and the second reference holes 24 are arranged at predetermined respective positions in the first positioner 21. Therefore, by bringing the first reference holes 71 into coincidence with the second reference holes 24, any position on the frame member 70 relative to the first positioner 21 can be specified. By the first positioner 21 extending in the direction orthogonal to the machining axis 41 of the riveter 40, the frame member 70 is disposed such that its machining surface extends in the direction orthogonal to the machining axis 41 of the riveter 40.

Figure 6:
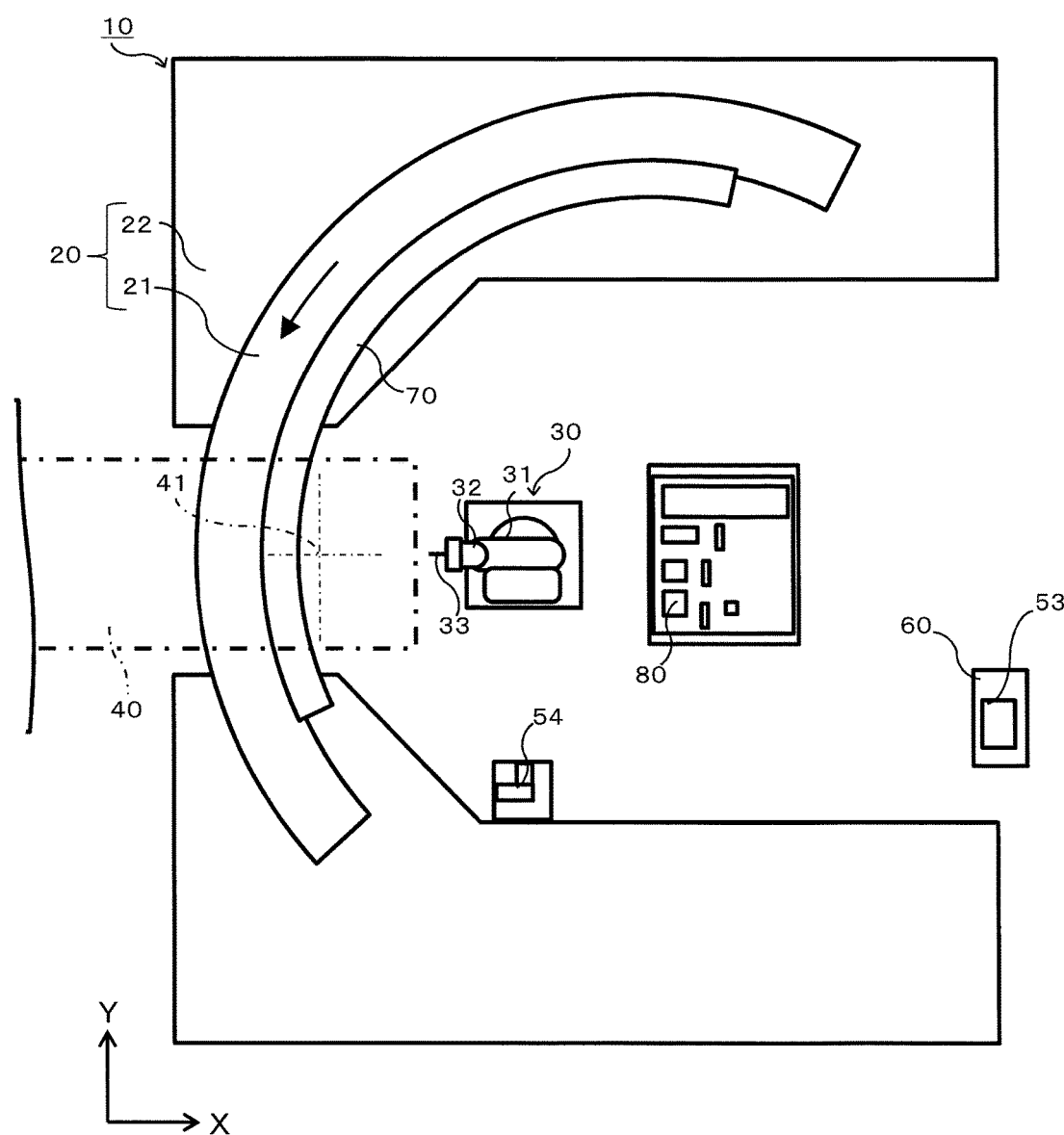
FIG. 6 shows a state where the first positioner is moved in a circumferential direction, an X-direction, and a Y-direction, such that a mounting position present on the frame member is located on a machining axis of a riveter.

Next, positioning of the mounting position present on the frame member 70 relative to the machining axis 41 of the riveter 40 is performed (step S2). As shown in FIG. 6, the first positioner 21 is moved in the circumferential direction, and the second positioner 22 is moved in the X-direction and the Y-direction, such that the mounting position present on the frame member 70 is located on the machining axis 41 of the riveter 40.

Next, the component 80 is held and moved (step S3). As shown in FIG. 7A, the arm 31 is turned to move the hand 33 to a pallet. Various components 80 are arranged at predetermined positions on the pallet. Accordingly, the hand 33 is moved to a position on the pallet, at which position the component 80 corresponding to the mounting position is present. Then, as shown in FIG. 7B, the hand 33 is moved in the Z-direction by the wrist 32, and the hand 33 holds the component 80.

Figure 8:
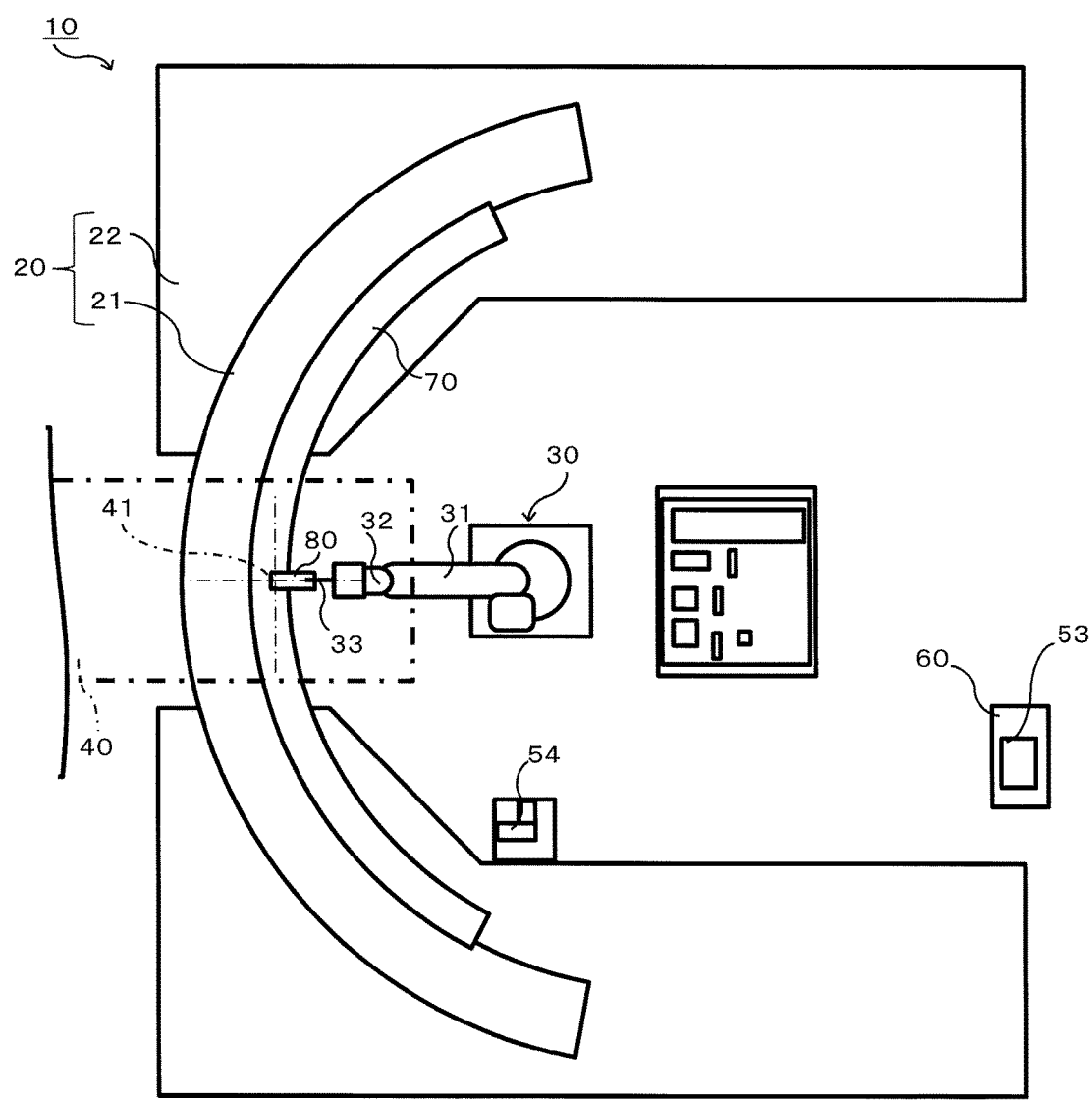
FIG. 8 shows a state where a machining position present on the component is located at a predetermined position on the machining axis of the riveter.

As shown in FIG. 8, the arm 31 is turned about the base axis 34 to move the machining position present on the component 80 to a predetermined position on the machining axis 41 of the riveter 40. The predetermined position is above the frame member 70 and below the first detector 50. At the predetermined position, the component 80 is not in contact with the frame member 70, and a predetermined gap is formed between the component 80 and the frame member 70.

Figure 9:
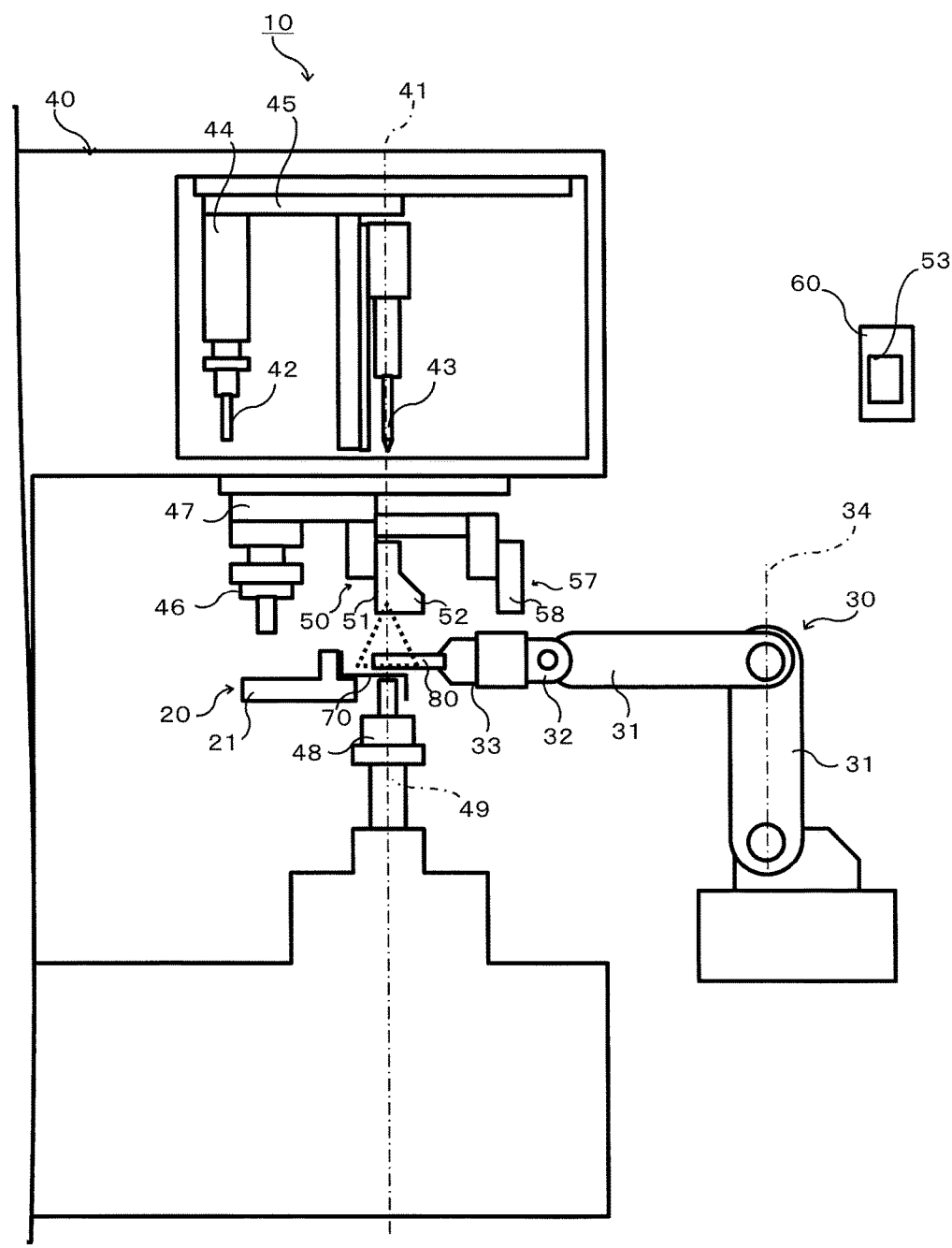
FIG. 9 shows a state where a first sensor detects the position and tilt of the component.

Next, the position and tilt of the component 80 are measured (step S4). As shown in FIG. 9, the first detector 50 is moved in the X-direction by the second displacer 47, such that the optical axis of the first camera 51 coincides with the machining axis 41. Then, the first laser emitter 52 emits laser light to the component 80 from above the component 80. From above the component 80, the first camera 51 obtains an image of the upper surface of the component 80, on which the laser light is projected, and outputs the image to the image processor 53.

The image processor 53 obtains the contour of the component 80 based on the image, and obtains amounts of deviation of the contour of the component 80 from first reference information prestored in the storage unit. Based on the obtained amounts of deviation, an amount of deviation $\Delta X$ of the position in the X-direction, an amount of deviation $\Delta Y$ of the position in the Y-direction, and an amount of deviation $\Delta RZ$ of the rotation about the Z-axis, are calculated. It should be noted that the first reference information is based on the design information of the component 80, and indicates the contour of the component 80 at the predetermined position. The first reference information is preset such that the machining position present on the component 80 is located on the machining axis 41 of the riveter 40.

The image processor 53 also obtains the shape and length of the laser light projected on the component 80 based on the image, and obtains amounts of deviation of the shape and length of the laser light from second reference information prestored in the storage unit. Based on the obtained amounts of deviation, an amount of deviation $\Delta Z$ in the Z-direction, an amount of deviation $\Delta RX$ of the tilt about the X-axis, and an amount of deviation $\Delta RY$ of the tilt about the Y-axis are calculated. It should be noted that the second reference information is information indicating the shape and length of the laser light projected on the predetermined position.

Next, it is determined whether or not the amounts of deviation of the position and tilt of the component 80 are within predetermined respective thresholds (step S5). If the amounts of deviation are within the respective thresholds (step S5: YES), the flow proceeds to the process in step S7. On the other hand, if the amounts of deviation are greater than the respective thresholds (step S5: NO), the flow proceeds to the process in step S6.

In the process in step S6, the position and so forth of the component 80 are corrected. For example, the arm 31, the wrist 32, and the hand 33 are moved so as to eliminate the amounts of deviation. As a result, the tilt, position, and so forth of the component 80 are corrected such that the machining position present on the component 80 is located at the predetermined position on the machining axis 41, and such that the machining direction of the component 80 at the machining position coincides with the machining axis 41. After the correction, the position and tilt of the component 80 are measured again (step S4), and it is determined whether or not the amounts of deviation are within the predetermined respective thresholds (step S5). This operation is repeated until it is determined that the amounts of deviation are within the respective thresholds. In this manner, the positioning of the component 80 relative to the machining axis 41 of the riveter 40 is performed.

Next, the component 80 is fixed to the riveter 40 (step S7). As shown in FIG. 10A, after the orientation of the component 80 has suitably been corrected, the component 80 in the suitable orientation is lowered along the machining axis 41 and thereby brought closer to the frame member 70. In this manner, the position of the component 80 is changed only in the Z-direction along the machining axis 41, and the position and tilt of the component 80 in the other directions, i.e., the X-direction and the Y-direction, are not changed. The lower surface of the component 80 is brought into contact with the upper surface of the frame member 70. At the time, the lower surface of the frame member 70 is located on the upper end of the lower clamp 48, and the frame member 70 is supported by the lower clamp 48.

Then, as shown in FIG. 10B, the pressure foot 46 is moved in the X-direction by the second displacer 47, such that the central axis of the pressure foot 46 coincides with the machining axis 41. As shown in FIG. 10C, the pressure foot 46 is lowered to bring the lower end of the pressure foot 46 into contact with the upper surface of the component 80. As a result, the component 80 and the frame member 70 are sandwiched between the pressure foot 46 and the lower clamp 48, and thus fixed.

Subsequently, the holding of the component 80 is released (step S8). As shown in FIG. 11A, the holding of the component 80 by the hand 33 is released. At the time, since the component 80 is fixed by the pressure foot 46 and the lower clamp 48, the position and tilt of the component 80 do not change. Then, as shown in FIG. 11B, the arm 31 is turned to remove the robot 30 from the riveter 40.

Next, a hole is machined in each of the component 80 and the frame member 70 along the machining axis 41 (step S9). As shown in FIG. 12A, the drill 43 is lowered along the machining axis 41 while being rotated. As a result, as shown in FIG. 12B, the drill 43 advances into the hollow center of the pressure foot 46 to machine a hole in each of the component 80 and the frame member 70 along the machining axis 41, and advances into the hollow center of the lower clamp 48. Since the machining position present on the component 80 and the mounting position present on the frame member 70 are located on the respective axes, one hole (first hole) is formed at the mounting position, and the other hole (second hole) is formed at the machining position.

Then, the component 80 and the frame member 70 are fastened together by the rivet 42 (step S10). As shown in FIG. 13A, the upper anvil 44 is moved in the X-direction by the first displacer 45, such that the central axis of the shaft of the rivet 42 coincides with the machining axis 41. Thereafter, as shown in FIG. 13B, the rivet 42 is lowered by the upper anvil 44 along the machining axis 41. At the time, as shown in FIG. 13C, the lower anvil 49 is disposed in the hollow center of the lower clamp 48. As a result, the center lines of the shaft of the rivet 42, the hollow center of the pressure foot 46, the first hole, the second hole, the hollow center of the lower clamp 48, and the shaft of the lower anvil 49, respectively, are aligned on the machining axis 41. Therefore, after the rivet 42 has advanced through the hollow center of the pressure foot 46, the first hole, and the second hole, and when the insertion of the rivet 42 has been completed, the lower anvil 49 is lifted. As a result, the lower end of the rivet 42 is crushed, thereby swaging the rivet 42, and thus the component 80 and the frame member 70 are fastened together by the rivet 42.

Subsequently, if another machining position is present on the same component 80 (step S11: YES) as shown in FIG. 14A, then as shown in FIG. 14B, the machining axis 41 of the riveter 40 is positioned at a corresponding mounting position present on the frame member 70 (step S12). Since the process in step S12 is the same as the process in step S2, the description of the process in step S12 is omitted. At the time, the pressure foot 46 is lifted and the lower clamp 48 is lowered, and the frame member 70 is moved by the first positioner 21. Since the component 80 is already fixed to the frame member 70 by the rivet 42, as a result of performing the positioning of the frame member 70, the component 80 is concurrently positioned relative to the machining axis 41.

Next, the component 80 is fixed to the riveter 40 (step S13). Since the process in step S13 is the same as the process in step S7, the description of the process in step S13 is omitted. Then, a hole is machined in each of the component 80 and the frame member 70 (step S14). Since the process in step S14 is the same as the process in step S9, the description of the process in step S14 is omitted. Thereafter, the component 80 and the frame member 70 are fastened together by a rivet 42 (step S15). Since the process in step S15 is the same as the process in step S10, the description of the process in step S15 is omitted.

According to the above-described configuration, since the first camera 51 is provided on the machining axis 41, the position and tilt of the component 80 on the machining axis 41 can be detected. Based on the detected position and tilt, the machining position and the machining direction of the component 80 can be brought into coincidence with the machining axis 41. Accordingly, the component 80 thus positioned need not be moved from the position to be on the machining axis 41. Thus, positional deviation of the component 80 due to such movement is prevented, which makes it possible to highly precisely position the component 80 relative to the frame member 70 when mounting the component 80 to the frame member 70.

The positioning of the mounting position present on the frame member 70 relative to the machining axis 41 of the riveter 40 is performed by the positioning unit 20. Also, the positioning of the machining position present on the component 80 relative to the machining axis 41 of the riveter 40 is performed by the robot 30. Accordingly, by merely machining a hole in each of the component 80 and the frame member 70 along the machining axis 41 and inserting the rivet 42 in each of the holes, the mounting position present on the frame member 70 and the machining position present on the component 80 can be fixed together by the rivet 42.

The robot 30 is used to perform the positioning of the component 80, and a conveying apparatus is used as the positioning unit 20, which performs the positioning of the frame member 70. This makes it possible to improve the precision of the positioning of the component 80 and the frame member 70, and to reduce the time and cost for the positioning compared to a case where the positioning is manually performed by an operator. Moreover, since it is not necessary to use an expensive positioning jig, the cost can be reduced. Furthermore, since a place of storage for a large positioning jig is not necessary, the convenience is increased.

Since the first camera 51 and the first laser emitter 52 are integrated together, the first detector 50 can be made compact. The first camera 51 obtains an image of the laser light that is emitted from the first laser emitter 52 and projected on the component 80. This eliminates the necessity of installation of a laser light detector, and thus the size and cost of the first detector 50 can be reduced.

In the example of FIG. 9, the image processor 53 determines the position and rotation of the component 80 based on the image of the component 80, which is obtained by the first camera 51. However, in a case where the machining position present on the component 80 is brought onto the machining axis 41, and the machining direction of the component 80 at the machining position is brought into coincidence with the machining axis 41, the image processor 53 may determine only the position of the component based on the image obtained by the first camera 51.

In the example of FIG. 9, the first camera 51 captures an image of the component 80, on which the laser light emitted from the first laser emitter 52 is projected. Based on the image, the image processor 53 determines the height and tilt of the component 80. However, in a case where the machining position present on the component 80 is brought onto the machining axis 41, and the machining direction of the component 80 at the machining position is brought into coincidence with the machining axis 41, the image processor 53 may determine only the tilt of the component based on the image obtained by the first camera 51.

Embodiment 2

The component mounting system 10 according to Embodiment 2 further includes a second detector 54 shown in FIG. 15A to FIG. 15C in addition to the constituent elements of the component mounting system 10 according to Embodiment 1. The second detector 54 is provided at a position not on the machining axis 41. For example, the second detector 54 is provided at a position that is outside the inner space of the riveter 40.

The second detector 54 includes: a sensor (second sensor) configured to detect the tilt of the component 80 from a direction that is different than the direction of detection by the first sensor; and the image processor 53. The second sensor is constituted by an image obtainer 55 and a laser emitter (second laser emitter) 56. In the present embodiment, the image processor 53 of the first detector 50 doubles as the image processor 53 of the second detector 54. However, as an alternative, the image processor 53 of the second detector 54 may be provided separately from the image processor 53 of the first detector 50. Although the controller 60 includes the image processor 53 in the present embodiment, the image processor 53 may be provided separately from the controller 60.

The image obtainer 55 is a light receiver configured to receive laser light emitted from the second laser emitter 56. For example, a camera that obtains an image of the component 80 is used as the image obtainer 55. The image obtainer 55 is disposed such that the optical axis of the camera is parallel to the machining axis 41 of the riveter 40. The image obtainer 55 outputs the obtained image of the component 80 to the image processor 53.

The second laser emitter 56 is a device configured to emit laser light to the component 80. The image obtainer 55 obtains an image of the component 80, on which the laser light emitted from the second laser emitter 56 is projected, and outputs the image to the image processor 53. Based on, for example, the position or shape of the laser light projected on the component 80, the height (Z coordinate) and tilt (tilt RX about the X-axis and tilt RY about the Y-axis) of the component 80 are determined.

The first camera 51 and the first laser emitter 52 are arranged such that they are located above the component 80 at the time of obtaining an image thereof and at the time of emitting the laser light. Accordingly, the first camera 51 obtains an image of the upper side of the component 80, and the first laser emitter 52 emits the laser light to the upper side of the component 80. On the other hand, the image obtainer 55 and the second laser emitter 56 are arranged such that they are located below the component 80 at the time of obtaining an image thereof and at the time of emitting the laser light. Accordingly, the image obtainer 55 obtains an image of the lower side of the component 80, and the second laser emitter 56 emits the laser light to the lower side of the component 80. It should be noted that the positional relationship of the first camera 51 and the first laser emitter 52 with the component 80, and the positional relationship of the image obtainer 55 and the second laser emitter 56 with the component 80, may be reverse to each other. The first camera 51 and the first laser emitter 52 are arranged above the component 80, and the image obtainer 55 and the second laser emitter 56 are arranged below the component 80.

For example, there is a case where the height (Z coordinate) and tilt (tilt RX about the X-axis and tilt RY about the Y-axis) of the component 80 cannot be detected by the first detector 50 for the reason that the component 80 is small, or that the component 80 has a complicated shape. In such a case, the second detector 54 is used.

Operations of the component mounting system 10 (i.e., component mounting method) by use of the second detector 54 are performed as processes shown in FIG. 4. It should be noted that the processes in Embodiment 2, except those in steps S3 to S6, are the same as the processes described in Embodiment 1. Therefore, the description of the same processes as those described in Embodiment 1 is omitted.

In step S3, the component 80 is held and moved.

First, the arm 31 is turned to move the component 80 to a position above the second detector 54. The distance between the component 80 and the second detector 54 at the time is set in advance.

Then, the position and tilt of the component 80 are measured. The second laser emitter 56 of the second detector 54 emits laser light from below the component 80 to the lower side of the component 80. From below the component 80, the image obtainer 55 obtains an image of the lower side of the component 80, on which the laser light is projected, and outputs the image to the image processor 53.

The image processor 53 obtains the shape and length of the laser light projected on the component 80 based on the image, and obtains amounts of deviation of the shape and length of the laser light from the second reference information prestored in the storage unit. Based on the obtained amounts of deviation, an amount of deviation ΔZ in the Z-direction, an amount of deviation ΔRX of the tilt about the X-axis, and an amount of deviation ΔRY of the tilt about the Y-axis are calculated.

Next, the position and so forth of the component 80 are corrected so as to eliminate the amounts of deviation of the height, tilt, and so forth of the component 80. Here, the arm 31, the wrist 32, and the hand 33 are moved.

Further, as shown in FIG. 8, the arm 31 is turned to move the machining position present on the component 80 to the predetermined position on the machining axis 41 of the riveter 40.

Thereafter, in step S4, the position and rotation of the component 80 are measured, and amounts of deviation thereof are calculated.

Subsequently, if the amounts of deviation of the position and rotation of the component 80 are greater than respective thresholds (step S5: NO), the position and so forth of the component 80 are corrected so as to eliminate the amounts of deviation (step S6). Here, the arm 31, the wrist 32, and the hand 33 are moved. As a result, the tilt, position, and so forth of the component 80 are corrected such that the machining position present on the component 80 is located at the predetermined position on the machining axis 41, and such that the machining direction of the component 80 at the machining position coincides with the machining axis 41. In this manner, the positioning of the component 80 relative to the machining axis 41 of the riveter 40 is performed.

According to the above-described configuration, the second laser emitter 56 emits the laser light to the component 80 from a direction that is different than the direction of the laser light emission by the first laser emitter 52, and the image obtainer 55 obtains an image of the component 80, on which the laser light is projected. Accordingly, even in a case where the position and tilt of the component 80 cannot be detected by the first laser emitter 52 and the first camera 51, the position and tilt of the component 80 can be detected by the second laser emitter 56 and the image obtainer 55. Then, based on the detection results, the position, tilt, and so forth of the component 80 are corrected, which makes it possible to highly precisely position the component 80 relative to the frame member 70 when mounting the component 80 to the frame member 70.

In the example of FIG. 15A, the second laser emitter 56 and the image obtainer 55 are provided at positions not on the machining axis 41. However, the image obtainer 55, or both the image obtainer 55 and the second laser emitter 56, may be provided on the machining axis 41. In this case, the image obtainer 55 is disposed such that the component 80 is interposed between the image obtainer 55 and the first camera 51. Accordingly, after the position of the component 80 is detected by the second laser emitter 56 and the image obtainer 55, the component 80 need not be moved from the detected position to be on the machining axis 41. This makes it possible to further increase the precision of the positioning of the component 80 relative to the frame member 70.

In the example of FIG. 15A, the image obtainer 55 captures an image of the component 80, on which the laser light emitted from the second laser emitter 56 is projected. Based on the image, the image processor 53 determines the height and tilt of the component 80. However, in a case where the machining position present on the component 80 is brought onto the machining axis 41, and the machining direction of the component 80 at the machining position is brought into coincidence with the machining axis 41, the image processor 53 may determine only the tilt of the component based on the image obtained by the image obtainer 55.

Embodiment 3

Figure 17:
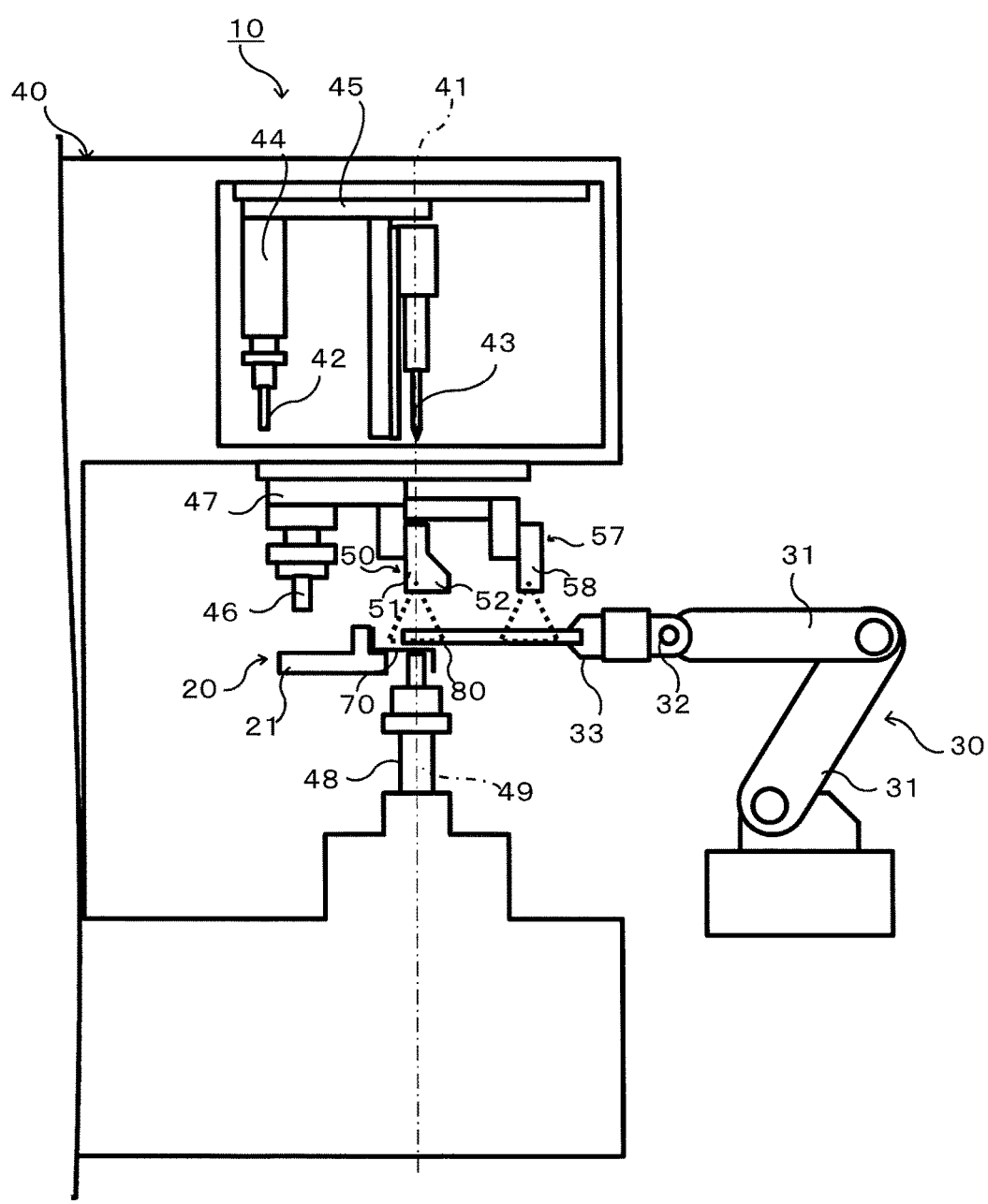
FIG. 17 is a side view of the component mounting system of FIG. 16.

The component mounting system 10 according to Embodiment 3 further includes a third detector 57 shown in FIG. 17 in addition to the constituent elements of the component mounting system 10 according to Embodiment 1. The third detector 57 is constituted by a second camera 58 and the image processor 53, and detects the position and tilt of the component 80.

In the present embodiment, the image processor 53 of the first detector 50 doubles as the image processor 53 of the third detector 57. However, as an alternative, the image processor 53 of the third detector 57 may be provided separately from the image processor 53 of the first detector 50. Although the controller 60 includes the image processor 53 in the present embodiment, the image processor 53 may be provided separately from the controller 60.

The second camera 58 is provided at a position not on the machining axis 41, for example, at a position between the machining axis 41 and the robot 30, and captures an image of the component 80 transferred to the mounting position. The second camera 58 is disposed such that the optical axis thereof is parallel to the machining axis 41 of the riveter 40. For example, the second camera 58 is mounted to the second displacer 47 in such a manner that the second camera 58, the first detector 50, and the pressure foot 46 are arranged in the X-direction. The second camera 58 is disposed such that the second camera 58 is closer to the robot 30 than the first detector 50 is.

The second camera 58 outputs the obtained image of the component 80 to the image processor 53. By comparing the obtained contour of the component 80 with design information such as CAD information stored in the controller 60, the position (X and Y coordinates) and rotation (tilt RZ about the Z-axis) of the component 80 are determined.

The first camera 51 is disposed on the machining axis 41 at the time of obtaining the image. Accordingly, the position and tilt of the component 80 near the machining axis 41 are obtained by the first camera 51. For example, assume that the component 80 is long, and the position and tilt of the component 80 slightly deviate from a desirable position and desirable tilt. In such a case, the deviation at a portion of the component 80 away from the machining position is greater than the deviation at a portion of the component 80 near the machining axis 41. In this case, the third detector 57 is used. Operations of the component mounting system 10 (i.e., component mounting method) by use of the third detector 57 are performed as processes shown in FIG. 4. It should be noted that the processes in Embodiment 3, except those in steps S3 to S6, are the same as the processes described in Embodiment 1. Therefore, the description of the same processes as those described in Embodiment 1 is omitted.

Figure 16:
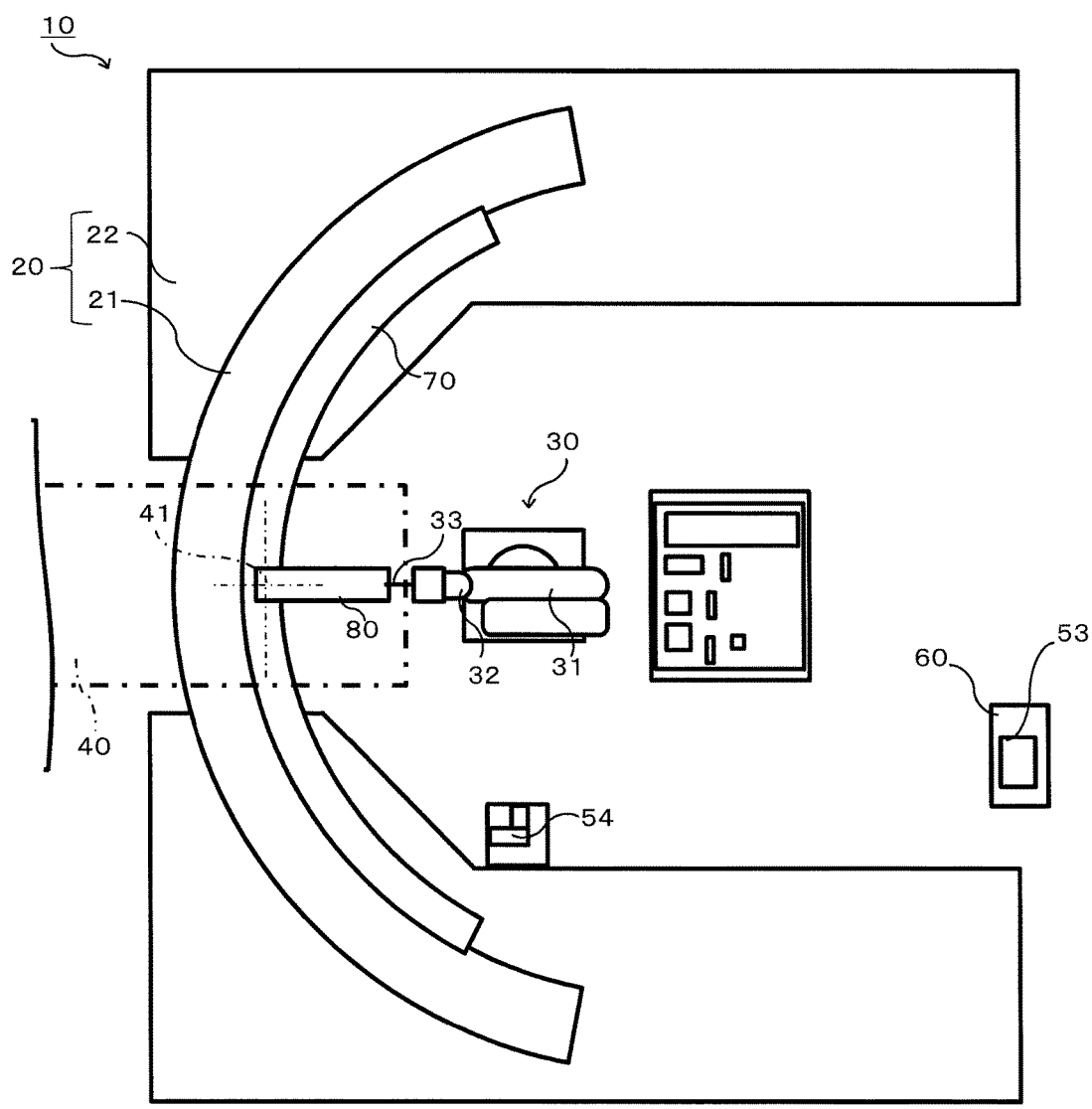
FIG. 16 is a top view of the component mounting system according to Embodiment 3 of the present invention.

In step S3, as shown in FIG. 16 and FIG. 17, the machining position present on the component 80 is moved by the robot 30 to the predetermined position on the machining axis 41 of the riveter 40. Then, the first camera 51 is moved in the X-direction by the second displacer 47, such that the optical axis of the first camera 51 coincides with the machining axis 41. As a result, the second camera 58 is disposed between the machining axis 41 and the robot 30.

Then, in step S4, the position and tilt of the component 80 are measured. The first laser emitter 52 emits laser light to the component 80 near the machining axis 41. The first camera 51 obtains an image of the component 80, on which the laser light is projected, and outputs the image to the image processor 53. Based on the image, the image processor 53 calculates amounts of deviation at the machining position.

Also, the second camera 58 obtains an image of a portion of the component 80 away from the machining axis 41, and outputs the image to the image processor 53. The image processor 53 determines amounts of deviation of the component 80 from a reference position, specifically, an amount of deviation ΔX of the position in the X-direction, an amount of deviation ΔY of the position in the Y-direction, and an amount of deviation ΔRZ of the rotation about the Z-axis.

If the amounts of deviation of the position, tilt, and so forth of the component 80 are greater than respective thresholds (step S5: NO), the position and so forth of the component 80 are corrected so as to eliminate the amounts of deviation (step S6). Accordingly, the tilt, position, and so forth of the component 80 are corrected such that the entire component 80 is disposed at a desirable position, and thus the positioning of the component 80 is performed relative to the machining axis 41 of the riveter 40.

According to the above configuration, in addition to the first camera 51, the second camera 58 is provided between the machining axis 41 and the robot 30. Accordingly, even in a case where deviation from a desirable position tends to occur at a portion of the component 80 away from the machining axis 41 due to, for example, the component 80 being long, the position and tilt of the portion can be detected by the second camera 58. Then, based on these detection results and detection results obtained by the first detector 50, the position, tilt, and so forth of the component 80 are corrected, which makes it possible to highly precisely position the component 80 relative to the frame member 70 when mounting the component 80 to the frame member 70.

In the example of FIG. 17, the image processor 53 determines the position and rotation of the component 80 based on the image of the component 80 obtained by the second camera 58. However, in a case where the machining position present on the component 80 is brought onto the machining axis 41, and the machining direction of the component 80 at the machining position is brought into coincidence with the machining axis 41, the image processor 53 may determine only the position of the component based on the image obtained by the second camera 58.

Other Embodiments

It should be noted that any of the above-described embodiments may be combined with each other, so long as the combined embodiments do not contradict with each other. For example, the component mounting system 10 according to Embodiment 3 may further include the second detector 54 according to Embodiment 2.

In all of the above-described embodiments, a conveying apparatus configured to convey the frame member 70 is used as the positioning unit 20. However, the positioning unit 20 is not thus limited, so long as the positioning unit 20 is configured to perform the positioning of the machining position present on the frame member 70 relative to the machining axis 41 of the riveter 40. For example, the positioning unit 20 may be configured to move the machining axis 41 of the riveter 40 relative to the machining position present on the frame member 70.

Although a conveying apparatus is used as the positioning unit 20 in all of the above-described embodiments, a positioning jig may alternatively be used as the positioning unit 20. The positioning jig is a jig configured to indicate a mounting position (where the component 80 is to be mounted) relative to the contour of the frame member 70.

In this case, an operator uses the positioning jig to specify the mounting position on the frame member 70, and performs the positioning of the frame member 70 relative to the riveter 40, such that the mounting position is located on the machining axis 41. Also in this case, the positioning of the machining position present on the component 80 relative to the machining axis 41 of the riveter 40 is performed by the robot 30 based on the position and tilt detected by the first detector 50. Accordingly, by driving the rivet 42 into the frame member 70 and the component 80 by the riveter 40 along the machining axis 41, the component 80 can be highly precisely positioned relative to the frame member 70 and mounted to the frame member 70.

Further, in all of the above-described embodiments, the first laser emitter 52 and the first camera 51 of the first detector 50 are integrated together. However, as an alternative, as shown in FIG. 18A and FIG. 18B, the first laser emitter 52 and the first camera 51 may be provided separately from each other. In this case, the laser light emitted from the first laser emitter 52 is received not by the first camera 51, but by a different light receiver. The light receiver may be a camera, or may be anything that detects the laser light reflected by the component 80. The light receiver and the first laser emitter 52 are integrated together.

In this case, the first camera 51, the first laser emitter 52, and the pressure foot 46 are arranged in the X-direction and are mounted to the second displacer 47. The order of the arrangement of the first camera 51, the first laser emitter 52, and the pressure foot 46 is not limited to this example. It should be noted that in a case where the second camera 58 is mounted to the second displacer 47, the second camera 58 is disposed such that the second camera 58 is closer to the robot 30 than the first camera 51 is.

In steps S3 to S6 of FIG. 4, as shown in FIG. 18A, the first laser emitter 52 is disposed on the machining axis 41, and the position and tilt of the component 80 are detected. Then, as shown in FIG. 18B, the first camera 51 is disposed on the machining axis 41, and the position and tilt of the component 80 are detected. Thereafter, the image processor 53 determines amounts of deviation at the machining position, and the robot 30 corrects the position, tilt, and so forth of the component 80 so as to eliminate the amounts of deviation. In this manner, the component 80 can be highly precisely positioned relative to the frame member 70 when mounting the component 80 to the frame member 70.

In all of the above-described embodiments, the first camera 51 and the first laser emitter 52 are used as the first detector 50. However, the first detector 50 is not limited to the first camera 51 and the first laser emitter 52, so long as the first detector 50 is capable of detecting the position and tilt of the component 80. Also, in the above description, the image obtainer 55 and the second laser emitter 56 are used as the second detector 54. However, the second detector 54 is not limited to the image obtainer 55 and the second laser emitter 56, so long as the second detector 54 is capable of detecting the position and tilt of the component 80. Further, in the above description, the second camera 58 is used as the third detector 57. However, the third detector 57 is not limited to the second camera 58, so long as the third detector 57 is capable of detecting the position and tilt of the component 80.

In all of the above-described embodiments, the rivet 42 is used as a fastener, and the riveter 40 is used as a machining apparatus. However, the fastener and the machining apparatus are not thus limited. For example, a different fastener other than the rivet, such as a bolt/nut fastener commonly known as a high lock fastener, can be used as the fastener. In this case, the machining apparatus performs the fastening not by swaging the rivet 42 but by fitting the bolt into the nut.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The component mounting system and the component mounting method of the present invention are useful as, for example, a component mounting system and a component mounting method that realize improvement in the precision of a mounting position when mounting a component to a frame member by using a robot.

REFERENCE SIGNS LIST

10 component mounting system
20 positioning unit
30 robot
40 riveter (machining apparatus)
41 machining axis
42 rivet (fastener)
51 first camera (camera, sensor, first camera, first sensor)
52 first laser emitter (sensor, first sensor)
54 second detector (second sensor)
58 second camera
70 frame member
80 component

The invention claimed is:

1. A component mounting system for mounting a component to a frame member by a fastener, the component mounting system comprising:
    a machining apparatus configured to machine a hole in each of the frame member and the component along a machining axis and fasten the frame member and the component together by the fastener;
    a positioning unit configured to perform positioning of a mounting position present on the frame member relative to the machining axis;
    a robot configured to transfer the component to the mounting position present on the frame member; and
    a detector including a camera and a sensor, the camera being provided on the machining axis and configured to capture an image of the component transferred to the mounting position, the sensor being configured to detect a tilt of the component transferred to the mounting position, wherein
    the robot performs positioning of a machining position present on the component and a machining direction of the component relative to the machining axis based on a position and the tilt of the component, the position being determined based on the image captured by the camera, the tilt being detected by the sensor.

2. The component mounting system according to claim 1, wherein
    the positioning unit is a conveying apparatus configured to move the frame member in a direction orthogonal to the machining axis.

3. The component mounting system according to claim 1, wherein
    the sensor includes a laser emitter configured to emit laser light to the component,
    the camera captures the image of the component, on which the laser light is projected, and
    the detector includes an image processor configured to determine the tilt of the component by processing the image captured by the camera.

4. The component mounting system according to claim 1, wherein
    the sensor is a first sensor, and the detector is a first detector, and
    the component mounting system further comprises a second detector including a second sensor configured to detect a tilt of the component from a direction that is different than a direction of detection by the first sensor.

5. The component mounting system according to claim 4, wherein
    the second sensor includes:
        a laser emitter configured to emit laser light to the component; and
        an image obtainer configured to capture an image of the component, on which the laser light is projected, and
    the second detector includes an image processor configured to process the image captured by the image obtainer to determine the tilt and a height of the component.

6. The component mounting system according to claim 1, wherein
    the camera is a first camera, and the detector is a first detector, and the component mounting system further comprises a third detector including a second camera provided at a position not on the machining axis, the second camera being configured to capture an image of the component transferred to the mounting position and detect a position of the component.

7. The component mounting system according to claim 6, wherein
the third detector includes an image processor configured to process the image captured by the second camera to determine the position and a rotation of the component.

8. The component mounting system according to claim 1, wherein
the fastener is a rivet, and
the machining apparatus is a riveter configured to machine the hole in each of the frame member and the component along the machining axis and fasten the frame member and the component together by the rivet.

9. The component mounting system according to claim 1, wherein
the frame member and the component are used in an aircraft.

10. A component mounting method comprising:
performing positioning of a mounting position present on a frame member relative to a machining axis;
transferring a component to the mounting position present on the frame member;
determining a position of the component based on an image of the component transferred to the mounting position, the image being captured on the machining axis;
detecting a tilt of the component transferred to the mounting position;
performing positioning of a machining position present on the component and a machining direction of the component relative to the machining axis based on the position and the tilt of the component; and
machining a hole in each of the frame member and the component along the machining axis, and fastening the frame member and the component together by a fastener.

* * * * *